(12) United States Patent
Bowden et al.

(10) Patent No.: US 11,111,170 B2
(45) Date of Patent: Sep. 7, 2021

(54) LASER CUTTING AND REMOVAL OF CONTOURED SHAPES FROM TRANSPARENT SUBSTRATES

(71) Applicant: CORNING INCORPORATED, Corning, NY (US)

(72) Inventors: Bradley Frederick Bowden, Corning, NY (US); Xiaoju Guo, Painted Post, NY (US); Thomas Hackert, Germering (DE); Garrett Andrew Piech, Corning, NY (US); Kristopher Allen Wieland, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 138 days.

(21) Appl. No.: 16/097,999

(22) PCT Filed: May 4, 2017

(86) PCT No.: PCT/US2017/031030
§ 371 (c)(1),
(2) Date: Oct. 31, 2018

(87) PCT Pub. No.: WO2017/192835
PCT Pub. Date: Nov. 9, 2017

(65) Prior Publication Data
US 2019/0144325 A1    May 16, 2019

Related U.S. Application Data

(60) Provisional application No. 62/350,978, filed on Jun. 16, 2016, provisional application No. 62/332,618, filed on May 6, 2016.

(51) Int. Cl.
*B23K 26/38* (2014.01)
*B23K 26/50* (2014.01)
(Continued)

(52) U.S. Cl.
CPC .......... *C03B 33/0222* (2013.01); *B23K 26/53* (2015.10); *C03B 33/04* (2013.01);
(Continued)

(58) Field of Classification Search
CPC ........ C03B 33/023–04; C03B 33/0222; B23K 26/1224; B23K 26/50–57; B23K 26/38–389
See application file for complete search history.

(56) References Cited

U.S. PATENT DOCUMENTS 1,790,397 A    1/1931  Woods et al.
2,682,134 A    6/1954  Stookey
(Continued)

FOREIGN PATENT DOCUMENTS

CN    1259924 A    7/2000
CN    2388062 Y    7/2000
(Continued)

OTHER PUBLICATIONS

McGloin et al."Bessel beams: diffraction in a new light" Contemporary Physics, vol. 46 No. 1 (2005) pp. 15-28.
(Continued)

*Primary Examiner* — Michael A Laflame, Jr.

(57) ABSTRACT

A method for cutting, separating and removing interior contoured shapes in thin substrates, particularly glass substrates. The method involves the utilization of an ultra-short pulse laser to form defect lines in the substrate that may be followed by use of a second laser beam to promote isolation of the part defined by the interior contour.

25 Claims, 8 Drawing Sheets

(51) Int. Cl.
*C03B 33/02* (2006.01)
*C03B 33/04* (2006.01)
*C03B 33/09* (2006.01)
*B23K 26/53* (2014.01)
*B23K 103/00* (2006.01)

(52) U.S. Cl.
CPC ........ *C03B 33/091* (2013.01); *B23K 2103/54* (2018.08); *Y02P 40/57* (2015.11)

(56) References Cited

U.S. PATENT DOCUMENTS

| | | |
|---|---|---|
| 2,749,794 A | 6/1956 | O'Leary |
| 3,647,410 A | 3/1972 | Heaton et al. |
| 3,695,497 A | 10/1972 | Dear |
| 3,695,498 A | 10/1972 | Dear |
| 3,729,302 A | 4/1973 | Heaton |
| 3,775,084 A | 11/1973 | Heaton |
| 4,226,607 A | 10/1980 | Domken |
| 4,441,008 A | 4/1984 | Chan |
| 4,546,231 A | 10/1985 | Gresser et al. |
| 4,646,308 A | 2/1987 | Kafka et al. |
| 4,764,930 A | 8/1988 | Bille et al. |
| 4,891,054 A | 1/1990 | Bricker et al. |
| 4,907,586 A | 3/1990 | Bille et al. |
| 4,918,751 A | 4/1990 | Pessot et al. |
| 4,929,065 A | 5/1990 | Hagerty et al. |
| 5,035,918 A | 7/1991 | Vyas |
| 5,040,182 A | 8/1991 | Spinelli et al. |
| 5,104,210 A | 4/1992 | Tokas |
| 5,108,857 A | 4/1992 | Kitayama et al. |
| 5,112,722 A | 5/1992 | Tsujino et al. |
| 5,114,834 A | 5/1992 | Nachson |
| 5,265,107 A | 11/1993 | Delfyett, Jr. |
| 5,400,350 A | 3/1995 | Galvanauskas |
| 5,418,803 A | 5/1995 | Zhiglinsky et al. |
| 5,434,875 A | 7/1995 | Rieger et al. |
| 5,436,925 A | 7/1995 | Lin et al. |
| 5,521,352 A | 5/1996 | Lawson |
| 5,553,093 A | 9/1996 | Ramaswamy et al. |
| 5,574,597 A | 11/1996 | Kataoka |
| 5,578,229 A | 11/1996 | Barnekov et al. |
| 5,586,138 A | 12/1996 | Yokoyama |
| 5,696,782 A | 12/1997 | Harter et al. |
| 5,736,709 A | 4/1998 | Neiheisel |
| 5,776,220 A | 7/1998 | Allaire et al. |
| 6,003,418 A * | 12/1999 | Bezama ............... B26D 7/1854 83/100 |
| 6,016,223 A | 1/2000 | Suzuki et al. |
| 6,055,829 A | 5/2000 | Witzmann et al. |
| 6,078,599 A | 6/2000 | Everage et al. |
| 6,156,030 A | 12/2000 | Neev |
| 6,160,835 A | 12/2000 | Kwon |
| 6,186,384 B1 | 2/2001 | Sawada |
| 6,210,401 B1 | 4/2001 | Lai |
| 6,256,328 B1 | 7/2001 | Delfyett et al. |
| 6,259,151 B1 | 7/2001 | Morrison |
| 6,259,512 B1 | 7/2001 | Mizouchi |
| 6,272,156 B1 | 8/2001 | Reed et al. |
| 6,301,932 B1 | 10/2001 | Allen et al. |
| 6,308,055 B1 | 10/2001 | Welland et al. |
| 6,322,958 B1 | 11/2001 | Hayashi |
| 6,339,208 B1 | 1/2002 | Rochstroh et al. |
| 6,373,565 B1 | 4/2002 | Kafka et al. |
| 6,381,391 B1 | 4/2002 | Islam et al. |
| 6,396,856 B1 | 5/2002 | Sucha et al. |
| 6,407,360 B1 | 6/2002 | Choo et al. |
| 6,438,996 B1 | 8/2002 | Cuvelier |
| 6,445,491 B2 | 9/2002 | Sucha et al. |
| 6,449,301 B1 | 9/2002 | Wu et al. |
| 6,484,052 B1 | 11/2002 | Visuri et al. |
| 6,489,589 B1 | 12/2002 | Alexander |
| 6,501,578 B1 | 12/2002 | Bernstein et al. |
| 6,552,301 B2 | 4/2003 | Herman et al. |
| 6,573,026 B1 | 6/2003 | Aitken et al. |
| 6,592,703 B1 | 7/2003 | Habeck et al. |
| 6,635,849 B1 | 10/2003 | Okawa et al. |
| 6,635,850 B2 | 10/2003 | Amako et al. |
| 6,720,519 B2 | 4/2004 | Liu et al. |
| 6,729,161 B1 | 5/2004 | Miura et al. |
| 6,744,009 B1 | 6/2004 | Xuan et al. |
| 6,787,732 B1 | 9/2004 | Xuan et al. |
| 6,800,237 B1 | 10/2004 | Yamamoto et al. |
| 6,800,831 B1 | 10/2004 | Hoetzel |
| 6,958,094 B2 | 10/2005 | Ohmi et al. |
| 6,992,026 B2 | 1/2006 | Fukuyo et al. |
| 7,009,138 B2 | 3/2006 | Amako et al. |
| 7,061,583 B2 | 6/2006 | Mulkens et al. |
| 7,353,829 B1 | 4/2008 | Wachter et al. |
| 7,511,886 B2 | 3/2009 | Schultz et al. |
| 7,535,634 B1 | 5/2009 | Savchenkov et al. |
| 7,633,033 B2 | 12/2009 | Thomas et al. |
| 7,642,483 B2 | 1/2010 | You et al. |
| 7,649,153 B2 | 1/2010 | Haight et al. |
| 7,726,532 B2 | 6/2010 | Gonoe |
| 8,104,385 B2 | 1/2012 | Hayashi et al. |
| 8,118,971 B2 | 2/2012 | Hori et al. |
| 8,132,427 B2 | 3/2012 | Brown et al. |
| 8,168,514 B2 | 5/2012 | Garner et al. |
| 8,245,539 B2 | 8/2012 | Lu et al. |
| 8,245,540 B2 | 8/2012 | Abramov et al. |
| 8,269,138 B2 | 9/2012 | Garner et al. |
| 8,283,595 B2 | 10/2012 | Fukuyo et al. |
| 8,292,141 B2 | 10/2012 | Cox et al. |
| 8,296,066 B2 | 10/2012 | Zhou et al. |
| 8,327,666 B2 | 12/2012 | Harvey et al. |
| 8,341,976 B2 | 1/2013 | Dejneka et al. |
| 8,347,651 B2 | 1/2013 | Abramov et al. |
| 8,358,888 B2 | 1/2013 | Ramachandran |
| 8,444,906 B2 | 5/2013 | Lee et al. |
| 8,448,471 B2 | 5/2013 | Kumatani et al. |
| 8,518,280 B2 | 8/2013 | Hsu et al. |
| 8,549,881 B2 | 10/2013 | Brown et al. |
| 8,584,354 B2 | 11/2013 | Cornejo et al. |
| 8,584,490 B2 | 11/2013 | Garner et al. |
| 8,592,716 B2 | 11/2013 | Abramov et al. |
| 8,604,380 B2 | 12/2013 | Howerton et al. |
| 8,607,590 B2 | 12/2013 | Glaesemann et al. |
| 8,616,024 B2 | 12/2013 | Cornejo et al. |
| 8,635,887 B2 | 1/2014 | Black et al. |
| 8,680,489 B2 | 3/2014 | Martinez et al. |
| 8,685,838 B2 | 4/2014 | Fukuyo et al. |
| 8,697,228 B2 | 4/2014 | Carre et al. |
| 8,720,228 B2 | 5/2014 | Li |
| 8,826,696 B2 | 9/2014 | Brown et al. |
| 8,852,698 B2 | 10/2014 | Fukumitsu |
| 8,887,529 B2 | 11/2014 | Lu et al. |
| 8,916,798 B2 | 12/2014 | Pluss |
| 8,943,855 B2 | 2/2015 | Gomez et al. |
| 8,971,053 B2 | 3/2015 | Kariya et al. |
| 9,138,913 B2 | 9/2015 | Arai et al. |
| 9,227,868 B2 | 1/2016 | Matsumoto et al. |
| 9,290,407 B2 | 3/2016 | Barefoot et al. |
| 9,296,066 B2 | 3/2016 | Hosseini et al. |
| 9,324,791 B2 | 4/2016 | Tamemoto |
| 9,327,381 B2 | 5/2016 | Lee et al. |
| 9,446,590 B2 | 9/2016 | Chen et al. |
| 9,481,598 B2 | 11/2016 | Bergh et al. |
| 9,815,730 B2 | 11/2017 | Marjanovic et al. |
| 9,850,160 B2 | 12/2017 | Marjanovic et al. |
| 10,730,783 B2 | 8/2020 | Akarapu et al. |
| 2002/0006765 A1 | 1/2002 | Michel et al. |
| 2002/0046997 A1 | 4/2002 | Nam et al. |
| 2002/0082466 A1 | 6/2002 | Han |
| 2002/0097486 A1 | 7/2002 | Yamaguchi et al. |
| 2002/0110639 A1 | 8/2002 | Bruns |
| 2003/0006221 A1 | 1/2003 | Hong et al. |
| 2004/0221615 A1 | 11/2004 | Postupack et al. |
| 2005/0024743 A1 | 2/2005 | Camy-Peyret |
| 2005/0098458 A1 | 5/2005 | Kobayashi et al. |
| 2005/0098548 A1 | 5/2005 | Kobayashi et al. |
| 2005/0115938 A1 | 6/2005 | Sawaki et al. |
| 2005/0274702 A1 | 12/2005 | Deshi |
| 2006/0011593 A1 | 1/2006 | Fukuyo et al. |

(56) References Cited

U.S. PATENT DOCUMENTS

| | | |
|---|---|---|
| 2006/0109874 A1 | 5/2006 | Shiozaki et al. |
| 2006/0127679 A1 | 6/2006 | Gulati et al. |
| 2006/0151450 A1 | 7/2006 | You et al. |
| 2006/0227440 A1 | 10/2006 | Gluckstad |
| 2006/0289410 A1 | 12/2006 | Morita et al. |
| 2007/0051706 A1 | 3/2007 | Bovatsek et al. |
| 2007/0053632 A1 | 3/2007 | Popp |
| 2007/0111390 A1 | 5/2007 | Komura et al. |
| 2007/0111480 A1 | 5/2007 | Maruyama et al. |
| 2007/0119831 A1 | 5/2007 | Kandt |
| 2007/0132977 A1 | 6/2007 | Komatsuda |
| 2007/0138151 A1 | 6/2007 | Tanaka et al. |
| 2007/0177116 A1 | 8/2007 | Amako |
| 2007/0202619 A1 | 8/2007 | Tamura et al. |
| 2007/0298529 A1 | 12/2007 | Maeda et al. |
| 2008/0000884 A1 | 1/2008 | Sugiura et al. |
| 2008/0099444 A1 | 5/2008 | Misawa et al. |
| 2008/0310465 A1 | 12/2008 | Achtenhagen |
| 2009/0013724 A1 | 1/2009 | Koyo et al. |
| 2009/0104721 A1 | 4/2009 | Hirakata et al. |
| 2009/0176034 A1 | 7/2009 | Ruuttu et al. |
| 2009/0183764 A1 | 7/2009 | Meyer |
| 2009/0242528 A1 | 10/2009 | Howerton et al. |
| 2009/0250446 A1 | 10/2009 | Sakamoto |
| 2009/0294419 A1 | 12/2009 | Abramov et al. |
| 2009/0294422 A1 | 12/2009 | Lubatschowski et al. |
| 2009/0324899 A1 | 12/2009 | Feinstein et al. |
| 2010/0025387 A1 | 2/2010 | Arai et al. |
| 2010/0029460 A1 | 2/2010 | Shojiya et al. |
| 2010/0032087 A1 | 2/2010 | Takahasahi et al. |
| 2010/0086741 A1 | 4/2010 | Bovatsek et al. |
| 2010/0089631 A1 | 4/2010 | Sakaguchi et al. |
| 2010/0089882 A1 | 4/2010 | Tamura |
| 2010/0102042 A1 | 4/2010 | Garner et al. |
| 2010/0129603 A1 | 5/2010 | Blick et al. |
| 2010/0147813 A1 | 6/2010 | Lei et al. |
| 2010/0252538 A1* | 10/2010 | Zeygerman ............ B23K 26/38 |
| | | 219/121.18 |
| 2010/0252540 A1 | 10/2010 | Lei et al. |
| 2010/0252959 A1 | 10/2010 | Lei et al. |
| 2010/0276505 A1 | 11/2010 | Smith |
| 2010/0279067 A1 | 11/2010 | Sabia et al. |
| 2010/0287991 A1 | 11/2010 | Brown et al. |
| 2010/0320179 A1 | 12/2010 | Morita et al. |
| 2010/0326138 A1 | 12/2010 | Kumatani et al. |
| 2011/0023298 A1 | 2/2011 | Chujo et al. |
| 2011/0049764 A1 | 3/2011 | Lee et al. |
| 2011/0049765 A1 | 3/2011 | Li et al. |
| 2011/0088324 A1 | 4/2011 | Wessel |
| 2011/0100401 A1 | 5/2011 | Fiorentini |
| 2011/0132881 A1 | 6/2011 | Liu |
| 2011/0183116 A1 | 9/2011 | Romashko et al. |
| 2011/0240611 A1 | 10/2011 | Sandstrom |
| 2011/0277507 A1 | 11/2011 | Lu et al. |
| 2011/0318555 A1 | 12/2011 | Bookbinder et al. |
| 2012/0017642 A1 | 1/2012 | Teranishi et al. |
| 2012/0047951 A1 | 3/2012 | Dannoux et al. |
| 2012/0048604 A1 | 3/2012 | Cornejo et al. |
| 2012/0061440 A1 | 3/2012 | Roell |
| 2012/0064306 A1 | 3/2012 | Kang et al. |
| 2012/0103018 A1 | 5/2012 | Lu et al. |
| 2012/0125588 A1 | 5/2012 | Nam et al. |
| 2012/0131962 A1 | 5/2012 | Mitsugi et al. |
| 2012/0135195 A1 | 5/2012 | Glaesemann et al. |
| 2012/0135607 A1 | 5/2012 | Shimoi et al. |
| 2012/0135608 A1 | 5/2012 | Shimoi et al. |
| 2012/0145331 A1 | 6/2012 | Gomez et al. |
| 2012/0196071 A1 | 8/2012 | Cornejo et al. |
| 2012/0234049 A1 | 9/2012 | Bolton |
| 2012/0234807 A1 | 9/2012 | Sercel et al. |
| 2012/0255935 A1 | 10/2012 | Kakui et al. |
| 2012/0299219 A1 | 11/2012 | Shimoi et al. |
| 2012/0302139 A1 | 11/2012 | Darcangelo et al. |
| 2013/0019637 A1 | 1/2013 | Sol et al. |
| 2013/0034688 A1 | 2/2013 | Koike et al. |
| 2013/0044371 A1 | 2/2013 | Rupp et al. |
| 2013/0061636 A1 | 3/2013 | Imai et al. |
| 2013/0068736 A1 | 3/2013 | Mielke et al. |
| 2013/0075480 A1 | 3/2013 | Yokogi et al. |
| 2013/0091897 A1 | 4/2013 | Fujii et al. |
| 2013/0122264 A1 | 5/2013 | Fujii et al. |
| 2013/0126573 A1 | 5/2013 | Hosseini et al. |
| 2013/0129947 A1 | 5/2013 | Harvey et al. |
| 2013/0133367 A1 | 5/2013 | Abramov et al. |
| 2013/0139708 A1* | 6/2013 | Hotta .................. B26D 7/32 |
| | | 101/26 |
| 2013/0143416 A1 | 6/2013 | Norval |
| 2013/0149434 A1 | 6/2013 | Oh et al. |
| 2013/0149494 A1 | 6/2013 | Koike et al. |
| 2013/0167590 A1 | 7/2013 | Teranishi et al. |
| 2013/0174607 A1 | 7/2013 | Wootton et al. |
| 2013/0174610 A1 | 7/2013 | Teranishi et al. |
| 2013/0180285 A1 | 7/2013 | Kariya |
| 2013/0189806 A1 | 7/2013 | Hoshino |
| 2013/0209731 A1 | 8/2013 | Nattermann et al. |
| 2013/0220982 A1 | 8/2013 | Thomas et al. |
| 2013/0221053 A1 | 8/2013 | Zhang |
| 2013/0224439 A1 | 8/2013 | Zhang et al. |
| 2013/0228918 A1 | 9/2013 | Chen et al. |
| 2013/0247615 A1 | 9/2013 | Boek et al. |
| 2013/0266757 A1 | 10/2013 | Giron et al. |
| 2013/0270240 A1 | 10/2013 | Kondo |
| 2013/0280495 A1 | 10/2013 | Matsumoto |
| 2013/0288010 A1 | 10/2013 | Akarapu et al. |
| 2013/0291598 A1 | 11/2013 | Saito et al. |
| 2013/0312460 A1 | 11/2013 | Kunishi et al. |
| 2013/0323469 A1 | 12/2013 | Abramov et al. |
| 2013/0334185 A1 | 12/2013 | Nomaru |
| 2013/0340480 A1 | 12/2013 | Nattermann et al. |
| 2014/0027951 A1 | 1/2014 | Srinivas et al. |
| 2014/0034730 A1 | 2/2014 | Lee |
| 2014/0042202 A1 | 2/2014 | Lee |
| 2014/0047957 A1 | 2/2014 | Wu |
| 2014/0076869 A1 | 3/2014 | Lee et al. |
| 2014/0102146 A1 | 4/2014 | Saito |
| 2014/0110040 A1 | 4/2014 | Cok |
| 2014/0113797 A1 | 4/2014 | Yamada et al. |
| 2014/0133119 A1 | 5/2014 | Kariya et al. |
| 2014/0141217 A1 | 5/2014 | Gulati et al. |
| 2014/0147623 A1 | 5/2014 | Shorey et al. |
| 2014/0147624 A1 | 5/2014 | Streltsov et al. |
| 2014/0165652 A1 | 6/2014 | Saito |
| 2014/0174131 A1 | 6/2014 | Saito et al. |
| 2014/0199519 A1 | 7/2014 | Schillinger et al. |
| 2014/0216108 A1 | 8/2014 | Wiegel et al. |
| 2014/0238962 A1* | 8/2014 | Nawrodt .................. B26F 1/02 |
| | | 219/121.7 |
| 2014/0290310 A1 | 10/2014 | Green |
| 2014/0320947 A1 | 10/2014 | Egerton et al. |
| 2014/0333929 A1 | 11/2014 | Sung et al. |
| 2014/0339207 A1 | 11/2014 | Sugiyama et al. |
| 2014/0361463 A1 | 12/2014 | Desimone et al. |
| 2015/0038313 A1 | 2/2015 | Hosseini |
| 2015/0075221 A1 | 3/2015 | Kawaguchi et al. |
| 2015/0075222 A1 | 3/2015 | Mader |
| 2015/0110442 A1 | 4/2015 | Zimmel et al. |
| 2015/0118522 A1 | 4/2015 | Hosseini |
| 2015/0136743 A1 | 5/2015 | Hosseini |
| 2015/0140241 A1 | 5/2015 | Hosseini |
| 2015/0140735 A1 | 5/2015 | Hosseini |
| 2015/0151380 A1 | 6/2015 | Hosseini |
| 2015/0158120 A1 | 6/2015 | Courvoisier et al. |
| 2015/0165548 A1 | 6/2015 | Marjanovic et al. |
| 2015/0165560 A1 | 6/2015 | Hackert et al. |
| 2015/0165562 A1 | 6/2015 | Marjanovic et al. |
| 2015/0165563 A1 | 6/2015 | Manley et al. |
| 2015/0166391 A1 | 6/2015 | Marjanovic et al. |
| 2015/0166393 A1 | 6/2015 | Marjanovic et al. |
| 2015/0166395 A1 | 6/2015 | Marjanovic et al. |
| 2015/0166396 A1 | 6/2015 | Marjanovic et al. |
| 2015/0166397 A1 | 6/2015 | Marjanovic et al. |
| 2015/0183679 A1 | 7/2015 | Saito |
| 2015/0209922 A1* | 7/2015 | Yoshikawa ............ B41J 29/393 |
| | | 29/890.1 |

(56) References Cited

U.S. PATENT DOCUMENTS

| | | |
|---|---|---|
| 2015/0232369 A1 | 8/2015 | Marjanovic et al. |
| 2015/0299018 A1 | 10/2015 | Bhuyan et al. |
| 2015/0352671 A1* | 12/2015 | Darzi ............... B23K 26/38 219/121.71 |
| 2015/0367442 A1 | 12/2015 | Bovatsek et al. |
| 2016/0008927 A1 | 1/2016 | Grundmueller et al. |
| 2016/0009066 A1 | 1/2016 | Nieber et al. |
| 2016/0009585 A1 | 1/2016 | Bookbinder et al. |
| 2016/0023922 A1 | 1/2016 | Addiego et al. |
| 2016/0031745 A1 | 2/2016 | Ortner et al. |
| 2016/0060156 A1 | 3/2016 | Krueger et al. |
| 2016/0280580 A1 | 9/2016 | Bohme |
| 2016/0290791 A1 | 10/2016 | Buono et al. |
| 2017/0052381 A1 | 2/2017 | Huang et al. |
| 2017/0169847 A1 | 6/2017 | Tamaki |
| 2017/0368638 A1 | 12/2017 | Tayebati et al. |
| 2018/0134606 A1 | 5/2018 | Wagner et al. |
| 2018/0297887 A1 | 10/2018 | Spier et al. |

FOREIGN PATENT DOCUMENTS

| | | |
|---|---|---|
| CN | 1283409 C | 11/2006 |
| CN | 1890074 A | 1/2007 |
| CN | 1920632 A | 2/2007 |
| CN | 101031383 A | 9/2007 |
| CN | 101386466 A | 3/2009 |
| CN | 101502914 A | 8/2009 |
| CN | 201357287 Y | 12/2009 |
| CN | 101622722 A | 1/2010 |
| CN | 101637849 A | 2/2010 |
| CN | 201471092 U | 5/2010 |
| CN | 101980982 A | 2/2011 |
| CN | 102060437 A | 5/2011 |
| CN | 102105256 A | 6/2011 |
| CN | 102248302 A | 11/2011 |
| CN | 102343631 A | 2/2012 |
| CN | 102642092 A | 8/2012 |
| CN | 102649199 A | 8/2012 |
| CN | 102672355 A | 9/2012 |
| CN | 102898014 A | 1/2013 |
| CN | 102916081 A | 2/2013 |
| CN | 102923939 A | 2/2013 |
| CN | 103013374 A | 4/2013 |
| CN | 103143841 A | 6/2013 |
| CN | 203021443 U | 6/2013 |
| CN | 103273195 A | 9/2013 |
| CN | 103316990 A | 9/2013 |
| CN | 103339559 A | 10/2013 |
| CN | 103359947 A | 10/2013 |
| CN | 103359948 A | 10/2013 |
| CN | 103531414 A | 1/2014 |
| CN | 103746027 A | 4/2014 |
| CN | 203509350 U | 4/2014 |
| CN | 103817434 A | 5/2014 |
| CN | 104344202 A | 2/2015 |
| CN | 105164581 A | 12/2015 |
| CN | 105209218 A | 12/2015 |
| CN | 105517969 A | 4/2016 |
| DE | 2231330 A1 | 1/1974 |
| DE | 102006035555 A1 | 1/2008 |
| DE | 102012010635 A1 | 11/2013 |
| DE | 102013223637 A1 | 5/2015 |
| EP | 0270897 A1 | 6/1988 |
| EP | 609978 A1 | 8/1994 |
| EP | 1159104 B1 | 8/2004 |
| EP | 2202545 A1 | 6/2010 |
| EP | 2783784 A2 | 10/2014 |
| FR | 2989294 A1 | 10/2013 |
| GB | 1242172 | 8/1971 |
| JP | 1179770 A | 7/1989 |
| JP | 6318756 A | 11/1994 |
| JP | 9106243 A | 4/1997 |
| JP | 11269683 A | 10/1999 |
| JP | 11347758 A | 12/1999 |
| JP | 2001138083 A | 5/2001 |
| JP | 2002228818 A | 8/2002 |
| JP | 2003062756 A | 3/2003 |
| JP | 2003114400 A | 4/2003 |
| JP | 2003154517 A | 5/2003 |
| JP | 2003238178 A | 8/2003 |
| JP | 2004209675 A | 7/2004 |
| JP | 2005104819 A | 4/2005 |
| JP | 2005205440 A | 8/2005 |
| JP | 2005-263623 A | 9/2005 |
| JP | 2005288503 A | 10/2005 |
| JP | 3775250 | 5/2006 |
| JP | 2006130691 A | 5/2006 |
| JP | 2006-240948 A | 9/2006 |
| JP | 2006248885 A | 9/2006 |
| JP | 2007021548 A | 2/2007 |
| JP | 2007253203 A | 10/2007 |
| JP | 2009056482 A | 3/2009 |
| JP | 2010046761 A | 3/2010 |
| JP | 4592855 B2 | 12/2010 |
| JP | 2011049398 A | 3/2011 |
| JP | 4672689 B2 | 4/2011 |
| JP | 4880820 B2 | 2/2012 |
| JP | 2012024782 A | 2/2012 |
| JP | 2012031018 A | 2/2012 |
| JP | 2012159749 A | 8/2012 |
| JP | 2012-521889 | 9/2012 |
| JP | 2012187618 A | 10/2012 |
| JP | 2012-232894 A | 11/2012 |
| JP | 2013007842 A | 1/2013 |
| JP | 2013031879 A | 2/2013 |
| JP | 2013043808 A | 3/2013 |
| JP | 2013075802 A | 4/2013 |
| JP | 5274085 B2 | 5/2013 |
| JP | 2013091578 A | 5/2013 |
| JP | 5300544 B2 | 9/2013 |
| JP | 2013187247 A | 9/2013 |
| JP | 2013203630 A | 10/2013 |
| JP | 2013203631 A | 10/2013 |
| JP | 2013223886 A | 10/2013 |
| KR | 2009057161 A | 6/2009 |
| KR | 1020621 B1 | 3/2011 |
| KR | 2012015366 A | 2/2012 |
| KR | 2012074508 A | 7/2012 |
| KR | 2013031380 A | 3/2013 |
| KR | 1269474 B1 | 5/2013 |
| KR | 2013124646 A | 11/2013 |
| KR | 1344368 B1 | 12/2013 |
| KR | 2014022980 A | 2/2014 |
| KR | 2014022981 A | 2/2014 |
| KR | 20140064220 A | 5/2014 |
| TW | I362370 B | 4/2012 |
| TW | 201226345 A1 | 7/2012 |
| TW | 201436968 A | 10/2014 |
| TW | I468354 B | 1/2015 |
| TW | I520804 B | 2/2016 |
| WO | 1999029243 A1 | 6/1999 |
| WO | 1999063900 A1 | 12/1999 |
| WO | 2003/007370 A1 | 1/2003 |
| WO | 2004110693 A1 | 12/2004 |
| WO | 2006073098 A1 | 7/2006 |
| WO | 2007094160 A1 | 8/2007 |
| WO | 2008080182 A1 | 7/2008 |
| WO | 2008128612 A1 | 10/2008 |
| WO | 2009114375 A2 | 9/2009 |
| WO | 2010035736 A1 | 4/2010 |
| WO | 2011056781 A1 | 5/2011 |
| WO | 2012006736 A2 | 1/2012 |
| WO | 2012166753 A2 | 6/2012 |
| WO | 2012108052 A1 | 8/2012 |
| WO | 2013022148 A1 | 2/2013 |
| WO | 2013043173 A1 | 3/2013 |
| WO | 2013138802 A1 | 9/2013 |
| WO | 2013150990 A1 | 10/2013 |
| WO | 2013153195 A1 | 10/2013 |
| WO | 2014064492 A1 | 5/2014 |
| WO | 2014079478 A1 | 5/2014 |
| WO | 2014079570 A1 | 5/2014 |
| WO | 2015/095014 A1 | 6/2015 |

(56) References Cited

FOREIGN PATENT DOCUMENTS

| WO | 2015127583 A1 | 9/2015 |
|---|---|---|
| WO | 2016/007843 A1 | 1/2016 |
| WO | 2016005455 A1 | 1/2016 |
| WO | 2016010954 A2 | 1/2016 |
| WO | 2016154284 A1 | 9/2016 |
| WO | 2017/079570 A2 | 5/2017 |

OTHER PUBLICATIONS

Merola et al. "Characterization of Bessel beams generated by polymeric microaxicons" Meas. Sci. Technol. 23 (2012) 10 pgs.
Mirkhalaf, M. et al., Overcoming the brittleness of glass through bio-inspiration and micro-achitecture, Nature Communications, 5:3166/ncomm4166(2014).
Perry et al., "Ultrashort-pulse laser machining of dielectric materials"; Journal of Applied Physics, vol. 85, No. 9, May 1, 1999, American Institute of Physics, pp. 6803-6810.
Perry et al., "Ultrashort-pulse laser machining"; UCRL-ID-132159, Sep. 1998, pp. 1-38.
Perry et al., "Ultrashort-pulse laser machining"; UCRL-JC-132159 Rev 1., Jan. 22, 1999, pp. 1-24.
Polynkin et al., "Extended filamentation with temporally chirped femtosecond Bessel-Gauss beams in air"; Optics Express, vol. 17, No. 2, Jan. 19, 2009, OSA, pp. 575-584.
Romero et al. "Theory of optimal beam splitting by phase gratings. II. Square and hexagonal gratings" J. Opt. Soc. Am A/vol. 24 No. 8 (2007) pp. 2296-2312.
Salleo A et al., Machining of transparent materials using IR and UV nanosecond laser pulses, Appl. Physics A 71, 601-608, 2000.
Serafetinides et al., "Polymer ablation by ultra-short pulsed lasers" Proceedings of SPIE vol. 3885 (2000) http://proceedings.spiedigitallibrary.org/.
Serafetinides et al., "Ultra-short pulsed laser ablation of polymers"; Applied Surface Science 180 (2001) 42-56.
Shah et al. "Micromachining with a high repetition rate femtosecond fiber laser", Journal of Laser Micro/Nanoengineering vol. 3 No. 3 (2008) pp. 157-162.
Shealy et al. "Geometric optics-based design of laser beam shapers",Opt. Eng. 42(11), 3123-3138 (2003). doi:10.1117/1.1617311.
Stoian et al. "Spatial and temporal laser pulse design for material processing on ultrafast scales" Applied Physics A (2014) 114, p. 119-127.
Sundaram et al., "Inducing and probing non-thermal transitions in semiconductors using femtosecond laser pulses"; Nature Miracles, vol. 1, Dec. 2002, Nature Publishing Group (2002), pp. 217-224.
Thiele, "Relation between catalytic activity and size of particle" Industrial and Egineering Chemistry, vol. 31 No. 7, pp. 916-920.
Toytman et al. "Optical breakdown in transparent media with adjustable axial length and location", Optics Express vol. 18 No. 24, 24688-24698 (2010).
Vanagas et al., "Glass cutting by femtosecond pulsed irradiation"; J. Micro/Nanolith. MEMS MOEMS. 3(2), 358-363 (Apr. 1, 2004); doi: 10.1117/1.1668274.
Varel et al., "Micromachining of quartz with ultrashort laser pulses"; Applied Physics A 65, 367-373, Springer-Verlag (1997).
Velpula et al.. "Ultrafast imaging of free carriers: controlled excitation with chirped ultrafast laser Bessel beams", Proc. of SPIE vol. 8967 896711-1 (2014).
Wang et al, "Investigation on CO2 laser irradiation inducing glass strip peeling for microchannel formation", BIOMICROFLUIDICS 6, 012820 (2012).
Wu et al. "Optimal orientation of the cutting head for enhancing smoothness movement in three-dimensional laser cutting" (2013) Zhongguo Jiguang/Chinese Journal of Lasers, 40 (1), art. no. 0103005.
Xu et al. "Optimization of 3D laser cutting head orientation based on the minimum energy consumption" (2014) International Journal of Advanced Manufacturing Technology, 74 (9-12), pp. 1283-1291.

Yan et al. "Fiber structure to convert a Gaussian beam to higher-order optical orbital angular momentum modes" Optics Letters vol. 37 No. 16 (2012) pp. 3294-3296.
Yoshino et al., "Micromachining with a high repetition rate femtosecond fiber laser"; JLMN-Journal of Laser Micro/Nanoengineering vol. 3, No. 3 (2008), pp. 157-162.
Zeng et al. "Characteristic analysis of a refractive axicon system for optical trepanning"; Optical Engineering 45(9), 094302 (Sep. 2006), pp. 094302-1-094302-10.
Zhang et al., "Design of diffractive-phase axicon illuminated by a Gaussian-profile beam"; Acta Physica Sinica (overseas edition), vol. 5, No. 5 (May 1996) Chin. Phys. Soc., 1004-423X/96/05050354-11, pp. 354-364.
"What is the difference between Ra and RMS?"; Harrison Electropolishing LP; (http://www.harrisonep.com/electropolishingra.html), Accessed Aug. 8, 2016.
"EagleEtch" Product Brochure, EuropeTec USA Inc., pp. 1-8, Aug. 1, 2014.
"PHAROS High-power femtosecond laser system" product brochure; Light Conversion, Vilnius, LT; Apr. 18, 2011, pp. 1-2.
"TruMicro 5000" Product Manual, Trumpf Laser GmbH + Co. KG, pp. 1-4, Aug. 2011.
Abakians et al."Evaporative Cutting of a Semitransparent Body With a Moving CW Laser", J. Heat Transfer 110(4a), 924-930 (Nov. 1, 1988) (7 pages) doi:10.1115/1.3250594.
"Abramov et al., ""Laser separation of chemically strengthened glass"", Physics Procedia 5 (2010) 285-290, Elsevier.;doi: 10.1016/j.phpro.2010.08.054".
Ahmed et al. "Display glass cutting by femtosecond laser induced single shot periodic void array" Applied Physics A: Materials Science and Proccessing vol. 93 No. 1 (2008) pp. 189-192.
Arimoto et al., "Imaging properties of axicon in a scanning optical system"; Applied Optics, Nov. 1, 1992, vol. 31, No. 31, pp. 6653-6657.
Bagchi et al. "Fast ion beams from intense, femtosecond laser irradiated nanostructured surfaces" Applied Physics B 88 (2007) p. 167-173.
Bhuyan et al. "Laser micro- and nanostructuring using femtosecond Bessel beams", Eur. Phys. J. Special Topics 199 (2011) p. 101-110.
Bhuyan et al. "Single shot high aspect ratio bulk nanostructuring of fused silica using chirp-controlled ultrafast laser Bessel beams" Applied Physics Letters 104 (2014) 021107.
Bhuyan et al. "Ultrafast Bessel beams for high aspect ratio taper free micromachining of glass" Proc. of SPIE vol. 7728 77281V-1.
Bhuyan et al., "Femtosecond non-diffracting Bessel beams and controlled nanoscale ablation" by IEEE (2011).
Bhuyan et al., "High aspect ratio nanochannel machining using single shot femtosecond Bessel beams"; Applied Physics Letters 97, 081102 (2010); doi: 10.1063/1.3479419.
Bhuyan et al., "High aspect ratio taper-free microchannel fabrication using femtosecond Bessel beams"; Optics Express (2010) vol. 18, No. 2, pp. 566-574.
Case Design Guidelines for Apple Devices Release R5 (https://web.archive.org/web/20131006050442/https://developer.apple.com/resources/cases/Case-Design-Guidelines.pdf ; archived on Oct. 6, 2013).
Chiao et al. 9. "Self-trapping of optical beams," Phys. Rev. Lett, vol. 13, Num. 15, p. 479 (1964).
Corning Inc., "Corning® 1737 AM LCD Glass Substrates Material Information", issued Aug. 2002.
Corning Inc., "Corning® Eagle2000 TM AMLCD Glass Substrates Material Information", issued Apr. 2005.
Couairon et al. "Femtosecond filamentation in transparent media" Physics Reports 441 (2007) pp. 47-189.
Courvoisier et al. "Applications of femtosecond Bessel beams to laser ablation" Applied Physics A (2013) 112, p. 29-34.
Courvoisier et al. "Surface nanoprocessing with non-diffracting femtosecond Bessel beams" Optics Letters vol. 34 No. 20, (2009) p. 3163-3165.
Cubeddu et al., "A compact time-resolved reflectance system for dual-wavelength multichannel assessment of tissue absorption and scattering"; Part of the SPIE Conference on Optical Tomography

(56) References Cited

OTHER PUBLICATIONS and Spectroscopy of Tissue III, San Jose, CA (Jan. 1999), SPIE vol. 3597, 0277-786X/99, pp. 450-455.

Cubeddu et al., "Compact tissue oximeter based on dual-wavelength multichannel time-resolved reflectance"; Applied Optics, vol. 38, No. 16, Jun. 1, 1999, pp. 3670-3680.

Ding et al., "High-resolution optical coherence tomography over a large depth range with an axicon lens"; Optic Letters, vol. 27, No. 4, pp. 243-245, Feb. 15, 2002, Optical Society of America.

Dong et al. "On-axis irradiance distribution of axicons illuminated by spherical wave", Optics & Laser Technology 39 (2007) 1258-1261.

Duocastella et al. "Bessel and annular beams for material processing", Laser Photonics Rev. 6, 607-621, 2012.

Durnin. "Exact solutions for nondiffracting beams I. The scaler theory" J. Opt. Soc. Am. A. 4(4) pp. 651-654.

Eaton et al. "Heat accumulation effects in femtosecond laser written waveguides with variable repetition rates", Opt. Exp. 5280, vol. 14, No. 23, Jun. 2006.

Gattass et al. "Micromachining of bulk glass with bursts of femtosecond laser pulses at variable repetition rates" Opt. Exp. 5280, vol. 14, No. 23, Jun. 2006.

Girkin et al., "Macroscopic multiphoton biomedical imaging using semiconductor saturable Bragg reflector modelocked Lasers"; Part of the SPIE Conference on Commercial and Biomedical Applications of Ultrafast Lasers, San Jose, CA (Jan. 1999), SPIE vol. 3616, 0277-786X/99, pp. 92-98.

Glezer et al., "Ultrafast-laser driven micro-explosions in transparent materials"; Applied Physics Letters, vol. 71 (1997), pp. 882-884.

Golub, I., "Fresnel axicon"; Optic Letters, vol. 31, No. 12, Jun. 15, 2006, Optical Society of America, pp. 1890-1892.

Gori et al. "Analytical derivation of the optimum triplicator" Optics Communications 157 (1998) pp. 13-16.

Herman et al., "Laser micromachining of 'transparent' fused silica with 1-ps. pulses and pulse trains"; Part of the SPIE Conference on Commercial and Biomedical Applications of Ultrafast Lasers, San Jose, CA (Jan. 1999), SPIE vol. 3616, 0277-786X/99, pp. 148-155.

Honda et al. "A Novel Polymer Film that Controls Light Transmission", Progress in Pacific Polymer Science 3, 159-169 (1994).

http://www.gtat.com/Collateral/Documents/English-US/Sapphire/12-21-12_GT_TouchScreen_V3_web.pdf.

Hu et al. "5-axis laser cutting interference detection and correction based on STL model" (2009) Zhongguo Jiguang/Chinese Journal of Lasers, 36 (12), pp. 3313-3317.

Huang et al., "Laser etching of glass substrates by 1064 nm laser irradiation", Applied Physics, Oct. 2008, vol. 93, Issue 1, pp. 159-162.

Juodkazis S. et al. Laser induced microexplosion confined in the bulk of a sapphire crystal: evidence of multimegabar pressures., Phys. Rev. Lett. 96, 166101, 2006

Karlsson et al. "The technology of chemical glass strengthening—a review" Glass Technol: Eur. J. Glass Sci. Technol. A (2010) 51 (2) pp. 41-54.

Kosareva et al., "Formation of extended plasma channels in a condensed medium upon axicon focusing of a femtosecond laser pulse"; Quantum Electronics 35 (11) 1013-1014 (2005), Kvantovaya Elektronika and Turpion Ltd.; doi: 10.1070/QE2005v035n11ABEH013031.

Kruger et al., "Femtosecond-pulse visible laser processing of transparent materials"; Applied Surface Science 96-98 (1996) 430-438.

Kruger et al., "Laser micromachining of barium aluminium borosilicate glass with pluse durations between 20 fs and 3 ps"; Applied Surface Science 127-129 (1998) 892-898.

Kruger et al., "Structuring of dielectric and metallic materials with ultrashort laser pulses between 20 fs and 3 ps"; SPIE vol. 2991, 0277-786X/97, pp. 40-47.

Lapczyna et al., "Ultra high repetition rate (133 MHz) laser ablation of aluminum with 1.2-ps. pulses"; Applied Physics A 69 [Suppl.], S883-S886, Springer-Verlag (1999); doi: 10.1007/s003399900300.

Levy et al. "Design, fabrication, and characterization of circular Dammann gratings based on grayscale lithography," Opt. Lett vol. 35, No. 6, p. 880-882 (2010).

Liu X et al. "laser ablation and micromachining with ultrashort laser pulses", IEEE J. Quantum Electronics, 22, 1706-1716, 1997.

Maeda et al. "Optical performance of angle-dependent light-control glass", Proc. SPIE 1536, Optical Materials Technology for Energy Efficiency and Solar Energy Conversion X, 138 (Dec. 1, 1991).

Mbise et al. "Angular selective window coatings: theory and experiments" J. Phys. D: Appl. Phys. 30 2103 (1997).

Taiwanese Patent Application No. 106114913; Summary of the Office Action and Search Report dated Feb. 22, 2021; 8 pages; Taiwan Patent Office.

Tsai et al. ,"Internal modification for cutting transparent glass using femtosecond Bessel beams", Optical Engineering, Soc. of Photo-optical Instrumentation Engineering, Bellingham, vol. 53, May 2014, p. 51503.

ICNIRP, Infrared Radiation, https://www.icnirp.org/en/frequencies/infrared/index.html#:~:text=Wavelength, accessed Apr. 7, 2021 (Year: 2014).

Japanese Patent Application No. 2018-558168, Office Action dated Feb. 24, 2021, 5 pages (3 pages of English Translation and 2 pages of Original Document); Japanese Patent Office.

Liu,Xiuwen, "Graphical Audio-Visual Technology Tips", Apr. 30, 2006, pp. 58-59. (Original Document Only).

Tian e al., "Development status and Prospects of TFT-LCD Substrate Glass Chemical Composition", vol. 29, No. 6, 2010, pp. 1348-1362 (English Abstract Submitted).

\* cited by examiner

LASER CUTTING AND REMOVAL OF CONTOURED SHAPES FROM TRANSPARENT SUBSTRATES

CROSS-REFERENCE TO RELATED APPLICATIONS

This application claims the benefit of priority under 35 U.S.C. § 371 of International Application No. PCT/US17/31030, filed on May 4, 2017, which claims the benefit of priority under 35 U.S.C. § 119 of U.S. Provisional Application Ser. No. 62/350,978 filed on Jun. 16, 2016 and U.S. Provisional Application Ser. No. 62/332,618 filed on May 6, 2016, the contents of which are relied upon and incorporated herein by reference in their entirety as if fully set forth below.

FIELD

The present disclosure relates generally to apparatus and methods for cutting transparent substrates, and more particularly to apparatus and methods for cutting and removing interior portions from a glass sheet.

BACKGROUND

The cutting of articles from thin substrates of transparent materials, such as glass, can be accomplished by focused laser beams that ablate substrate material along a predetermined contour, where multiple passes are used to remove layer after layer of material until a part defined by the contour is no longer attached to the outer substrate piece. The problem with such ablative processes is that they require many passes of the laser beam to remove the material layer-by-layer, they generate significant debris that can contaminate the major surfaces of the article, and they can generate significant subsurface damage along the separated edge surfaces of the article as well as surface contamination. This damage may require extensive grinding or polishing to remove, adding to the complexity of the manufacturing process and increasing manufacturing cost. Such damage can also be particularly detrimental to processes for the manufacture of articles requiring defect-free edges and surfaces, for example, glass platters for hard disc drives (HDD), digital encoders, display devices e.g., display panels or display cover glass and the like.

SUMMARY

Embodiments described herein relate to a non-ablative process for cutting articles from thin transparent substrates (e.g., equal to or less than about 10 millimeters, for example in a range from about 0.01 millimeters to about 10 millimeters, in a range from about 0.05 millimeters to about 5 millimeters, in a range from about 0.05 to about 1 millimeters, or in a range from about 0.05 millimeters to about 0.7 millimeters) comprising glass, glass ceramic, ceramic or selected minerals, such as sapphire.

The cutting is based on inducing nonlinear absorption in the material to be processed by directing a laser beam of sufficient intensity at the substrate, wherein the substrate would be substantially transparent to the laser beam at a lesser intensity. Preferably, the laser beam is a pulsed laser beam. The cutting comprises producing a linear focus line within the transparent substrate that produces damage along the focus line, thereby creating a defect line. Unlike laser filamentation processes that rely on self-focusing as a result of the Kerr effect, in embodiments described herein, the laser and associated optics produce a line focus that does not depend on the presence of the substrate. Methods according to the present disclosure generate an induced absorption within the substrate along the line focus that produces a defect within the substrate along the laser beam focal line, preferably through an entire thickness of the substrate, without laser filamentation. The resulting defect may contain pockets or voids, but is typically not a through hole extending unobstructed through the entire thickness of the substrate.

Accordingly, a method of cutting an article from a substrate is disclosed, comprising: focusing a pulsed laser beam into a laser beam focal line, the laser beam focal line extending substantially orthogonal to a major surface of the substrate; directing the laser beam focal line into the substrate at a first plurality of locations along a first predetermined path, the laser beam focal line generating an induced absorption within the substrate that produces a defect line within the substrate along the laser beam focal line at each location of the first plurality of locations, wherein the first predetermined path is a closed path; heating the substrate along the first predetermined path to propagate a crack through each defect line of the first plurality of locations, thereby isolating an interior plug from the substrate; and heating the interior plug after the isolating to remove the plug from the substrate. The substrate is transparent at a wavelength of the pulsed laser beam. The first predetermined path may, for example, be a circular path. The substrate may comprise glass, glass ceramic, ceramic or sapphire.

In some embodiments, the defect line extends through an entire thickness of the substrate.

In some embodiments, a plurality of substrates may be stacked, for example two substrate, three substrates or more substrates, wherein the laser beam focal line extends through each substrate of the stack of substrates, thereby forming a defect line that extends through each substrate of the stack of substrates.

The method may further comprise directing the laser beam focal line into the substrate at a second plurality of locations along a second predetermined path not intersecting the first predetermined path, the laser beam focal line generating an induced absorption within the substrate that produces a defect line along the laser beam focal line within the substrate at each location of the second plurality of locations.

The method may further comprise heating the substrate along the second predetermined path to propagate a crack through each defect line of the second plurality of locations. The second predetermined path may, for example, be a circular path concentric with the first predetermined circular path. A radius of the second predetermined path can be greater than a radius of the first predetermined path such that the first predetermined path and the second predetermined path defining an annulus therebetween.

The method may further comprise directing the laser beam focal line into the substrate at a third plurality of locations along a third predetermined path, the laser beam focal line generating an induced absorption within the substrate that produces a defect line along the laser beam focal line within the substrate at each location of the third plurality of locations, the third predetermined path extending from an edge of the substrate to the second predetermined path.

The method may further comprise heating the substrate along the third predetermined path to propagate a crack through each defect line of the second plurality of locations. Heating the substrate along the first predetermined path may comprise traversing a second laser beam, for example a defocused laser beam, over the first predetermined path. The second laser beam may be a continuous wave laser beam. The second laser beam may be a $CO_2$ laser beam or a CO laser beam, e.g., a continuous wave $CO_2$ laser or a continuous wave CO laser.

Heating the plug after the isolating may comprise heating the plug with a heat source selected from the group consisting of a third laser beam, an infrared LED, an infrared lamp, and an electrical resistance heater. The third laser beam may be generated from the same laser as the second laser beam. The heat source may heat only a central area of the plug.

The third laser beam may traverse on the plug a plurality of closed paths spaced apart from the first predetermined path. The plug can deform during heating of the plug. In some embodiments, the plug may fall from the substrate without application of an externally applied force during or after heating the plug.

At least a portion of the plug may be heated to a temperature equal to or greater than a softening temperature of the substrate.

The method may further comprise positioning the substrate on a first major surface of a support substrate, the first major surface of the support substrate comprising a recess positioned below the plug.

The substrate may be restrained on the support substrate to prevent movement of the substrate. For example, in some embodiments, the support substrate may comprise a plurality of passages extending from a first major surface of the support substrate to a second major surface of the support substrate, and wherein the restraining comprises applying a vacuum to the plurality of passages.

The recess may further comprise a passage extending from the recess to a second major surface of the support substrate, wherein the method further comprising reducing a pressure within the recess through a passage extending from a floor of the recess to the second major surface through which a vacuum can be applied. A depth of the recess may be greater than a thickness of the plug.

The method may further comprise cooling the interior plug after the heating of the plug. In some embodiments, the interior plug drops from the substrate upon cooling without application of an external mechanical force to the interior plug.

In another embodiment, a glass article made by any of the foregoing aspects is described.

In still another embodiment, a method of cutting an article from a substrate is disclosed, comprising: focusing a pulsed laser beam into a laser beam focal line, the laser beam focal line extending substantially orthogonal to a major surface of the substrate; directing the laser beam focal line into the substrate at a first plurality of locations along a first predetermined path, the laser beam focal line generating an induced absorption within the substrate that produces a defect line within the substrate along the laser beam focal line at each location of the first plurality of locations, wherein the first predetermined path is a closed path; heating the substrate along the first predetermined path to propagate a crack through each defect line of the first plurality of locations, thereby isolating an interior plug from the substrate; and cooling the interior plug after the isolating to remove the plug from the substrate.

In some embodiments, a plurality of substrates may be stacked, for example two substrate, three substrates or more substrates, wherein the laser beam focal line extends through each substrate of the stack of substrates, for example an entire thickness of the stack, thereby forming a defect line that extends through each substrate of the stack of substrates.

The method may further comprise heating the plug prior to the cooling.

Heating the plug may comprise directing a second laser beam at a central region of the plug. The second laser beam may be, for example, a $CO_2$ laser beam or a CO laser beam.

Heating the plug may comprise heating at least a portion of the plug to a temperature equal to or greater than a softening temperature of the substrate.

In some embodiments, cooling the plug may comprise directing a cooling fluid, for example liquid nitrogen, against the plug.

In some embodiments, heating the plug may comprise heating the entire substrate.

In yet another embodiment, a glass article is described, comprising: a first major surface; a second major surface opposite the first major surface; a circular inner perimeter; a circular outer perimeter concentric with the inner perimeter, the inner perimeter and the outer perimeter defining an annulus therebetween, a thickness extending between the first and second major surfaces equal to or less than about 1 millimeter, a first edge surface between the first and second major surfaces and extending around the inner perimeter and a second edge surface between the first and second major surfaces and extending around the outer perimeter, at least one of the first or second edge surfaces comprising a plurality of defect lines extending orthogonally between the first and second major surfaces; and wherein a diameter of each defect line is less than or equal to about 5 micrometers. The first and second major surfaces may be free of any coating. The first and second major surfaces may be unground and unpolished. The first and second edge surfaces may be unground and unpolished.

In still another embodiment, a glass article is disclosed, comprising: a first major surface; a second major surface opposite the first major surface; a circular inner perimeter; a circular outer perimeter concentric with the inner perimeter, the inner perimeter and the outer perimeter defining an annulus therebetween, a thickness extending between first and second major surfaces equal to or less than about 1 millimeter, a first unground and unpolished edge surface between the first and second major surfaces and extending around the inner perimeter and a second unground and unpolished edge surface between the first and second major surfaces and extending around the outer perimeter; and wherein an $R_a$ surface roughness of at least one of the first or second edge surfaces is equal to or less than about 0.5 micrometers.

At least one of the first or second edge surfaces may comprise a plurality of defect lines extending orthogonally between the first and second major surfaces, and wherein a diameter of each defect line is less than or equal to about 5 micrometers.

A depth of subsurface damage along either one of the first or second edge surfaces may be equal to or less than about 75 micrometers, for example equal to or less than about 25 micrometers. A warp of the glass article can be equal to or less than about 50 micrometers, for example, equal to or less than about 15 micrometers.

An anneal point of the glass article may be equal to or greater than about 700° C., for example equal to or greater than about 800° C.

A compaction of the glass article after exposure to a temperature of 600° C. for a period of 30 minutes, upon cooling to a temperature of 23° C., can be equal to or less than about 35 ppm, for example equal to or less than about 20 ppm.

The glass article may comprise equal to or less than about 5 MPa internal residual stress.

In some embodiments, the glass article may be a chemically strengthened glass, for example a ion-exchanged glass.

An average roughness $R_a$ of either one of the first or second major surfaces can be equal to or less than about 1 nanometer, for example equal to or less than about 0.5 nanometers.

The glass article may comprise equal to or less than about 0.5 wt. %. $SnO_2$, for example equal to or less than about 0.15 wt. % $SnO_2$.

A distance between adjacent defect lines of the plurality of defect lines may be equal to or less than about 7 micrometers, for example equal to or less than about 5 micrometers, for example equal to or less than about 3 micrometers, for example equal to or less than about 1 micrometer.

The glass article may comprise less than or equal to 0.1% of an alkali metal oxide.

In some embodiments, the first and second major surfaces may be unground and unpolished. The first and second major surfaces may be free of any coating.

In some embodiments, a diameter of the circular outer perimeter is within +/−15 micrometers of a predetermined nominal circular outer diameter, for example within +/−10 micrometers of the predetermined nominal circular outer diameter.

In some embodiments, a diameter of the circular inner perimeter is within +/−25 micrometers of a predetermined nominal circular inner diameter, for example within +/−10 micrometers of the predetermined nominal circular inner diameter.

In some embodiments, a center of the inner circular perimeter and a center of the outer circular perimeter are displaced from each other by no more than about 10 micrometers, for example by no more than about 5 micrometers.

In yet another embodiment, a method of cutting a glass article from a transparent glass substrate is described, comprising: forming a first plurality of defects along a first closed path, the first plurality of defects extending into the glass substrate from a first major surface to an opposing major surface orthogonal to the first and second major surfaces; propagating a crack through each defect of the first plurality of defects, thereby isolating a plug from the substrate; heating the plug after the isolating; and wherein the plug falls from the substrate after a cessation of the heating without the application of an external force.

The method may further comprise forming a second plurality of defects along a second closed path concentric with the first closed path, the second plurality of defects extending into the glass substrate from the first major surface to the opposing major surface orthogonal to the first and second major surfaces, wherein a radius of the second closed path is greater than a radius of the first closed path.

The method may further comprise forming a third plurality of defects along a third path from an edge of the glass substrate to the second closed path, the third plurality of defects extending into the glass substrate from the first major surface to the opposing major surface orthogonal to the first and second major surfaces.

In some embodiments, a plurality of substrates may be stacked, for example two substrate, three substrates or more substrates, wherein the laser beam focal line extends through each substrate of the stack of substrates, thereby forming a defect line that extends through each substrate of the stack of substrates.

The method may further comprise heating the glass substrate along the second closed path, thereby driving a crack along the second closed path.

The method may further comprise heating the glass substrate along the third path, thereby driving a crack along the third path.

In still another embodiment, a method of cutting a glass article from a glass substrate is disclosed, comprising: forming a first plurality of defects along a first closed path, the first plurality of defects extending into the glass substrate from a first major surface to an opposing second major surface, the plurality of defect lines orthogonal to the first and second major surfaces; propagating a crack through each defect line of the first plurality of defect lines, thereby isolating a plug from the substrate; heating the plug after the isolating; and wherein the plug falls from the substrate after a cessation of the heating.

In some embodiments, a plurality of substrates may be stacked, for example two substrate, three substrates or more substrates, wherein the laser beam focal line extends through each substrate of the stack of substrates, thereby forming a defect line that extends through each substrate of the stack of substrates.

The method may further comprise positioning the glass substrate on a support substrate, the support substrate comprising a recess positioned beneath the first closed path, wherein a radius of the recess is greater than a radius of the first closed path.

The method may further comprise applying a vacuum to the recess during or after the heating.

In some embodiments, the forming comprises focusing a pulsed first laser beam into a laser beam focal line, the laser beam focal line extending substantially orthogonal through an entire thickness of the glass substrate between the first and second major surfaces of the glass substrate, the laser beam focal line generating an induced absorption within the substrate that produces a defect within the substrate along the laser beam focal line.

In some embodiments, propagating a crack may comprise heating the glass substrate along or adjacent to the first closed path with a second laser. The second laser may be, for example, a $CO_2$ or a CO laser.

In still another embodiment, a glass article is described, comprising: a glass sheet including a first major surface, a second major surface opposing and substantially parallel to the first major surface, and a thickness between the first and second major surfaces; a first plurality of circular fault lines, each circular fault line of the first plurality of fault lines comprising a plurality of defect lines extending through the thickness of the glass sheet and orthogonal to the first and second major surfaces, the plurality of defect lines of each circular fault line of the first plurality of circular fault lines spaced apart by a distance in a range from about 2 micrometer to about 20 micrometers, each circular fault line of the first plurality of circular fault lines including a center; and wherein the center of each circular fault line of the first plurality of circular fault lines is displaced from an adjacent circular fault line of the first plurality of circular fault lines.

The glass sheet may further comprise a second plurality of circular fault lines, each circular fault line of the second plurality of fault lines comprising a plurality of defect lines extending through the thickness of the glass sheet and orthogonal to the first and second major surfaces, the defect lines of each circular fault line of the second plurality of circular fault lines spaced apart by a distance in a range from about 2 micrometer to about 20 micrometers; and wherein each circular fault line of the first plurality of circular fault lines is circumscribed by a circular fault line of the second plurality of circular fault lines.

In some embodiments, each circular fault line of the first plurality of circular fault lines is an inner fault line and each circular fault line of the second plurality of fault lines is an outer fault line, each outer fault line of the second plurality of circular fault lines concentric with a respective inner fault line of the first plurality of circular fault lines.

The glass sheet comprises a length L and a width W orthogonal to L, each outer fault line defining a disc with a radius r, and in some embodiments $((L \cdot W) - n\pi r^2)/(L \cdot W)$ is greater than 0.66, where n represents a total number of discs defined on the glass sheet. In some embodiments, $L \cdot W$ is greater than 671,600 mm$^2$ and n is equal to or greater than 70.

The thickness of the glass sheet may be in a range from about 50 micrometers to about 3 millimeters, for example in a range from about 0.6 millimeters to about 0.7 millimeters.

In some embodiments, the first and second major surfaces of the glass sheet may be unground and unpolished.

In yet another embodiment, a method of cutting a glass article from a glass substrate is disclosed, comprising: forming a first plurality of defect lines along a first closed path, the first plurality of defect lines extending into the glass substrate from a first major surface to an opposing second major surface, the plurality of defect lines orthogonal to the first and second major surfaces; propagating a crack through each defect of the first plurality of defects, thereby isolating a plug from the substrate, the plug comprising a first major surface defined within a first outer perimeter, a second major surface defined within a second outer perimeter and a thickness $P_{thickness}$ extending between the first and second major surfaces, and an edge surface extending between the first and second major surfaces, wherein an intersection of the edge surface and the first major surface defines a first edge and an intersection of the edge surface and the second major surface defines a second edge; and changing a temperature of the plug and/or the glass substrate such that, $D_{initial} > \sqrt{D_{final}^2 + P_{thickness}^2}$, wherein $D_{initial}$ represents an initial diameter of the plug, $D_{final}$ represents a final diameter of the plug after changing the temperature.

In some embodiments, a plurality of substrates may be stacked, for example two substrates, three substrates or more substrates, wherein the plurality of defect lines extend through each substrate of the stack of substrates.

In some embodiments, changing the temperature may comprise heating the entire substrate, then cooling the plug with a coolant.

In some embodiments, changing the temperature may comprise cooling the plug with a coolant.

Additional features and advantages of the embodiments disclosed herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description present embodiments intended to provide an overview or framework for understanding the nature and character of the disclosure. The accompanying drawings are included to provide further understanding, and are incorporated into and constitute a part of this specification. The drawings illustrate various embodiments of the disclosure, and together with the description serve to explain the principles and operations thereof.

BRIEF DESCRIPTION OF THE DRAWINGS

The foregoing will be apparent from the following more particular description of example embodiments included herein, as illustrated in the accompanying drawings in which like reference characters refer to the same parts throughout the different views. The drawings are not necessarily to scale, emphasis instead being placed upon illustrating embodiments of the present disclosure.

DETAILED DESCRIPTION

Figure 1:
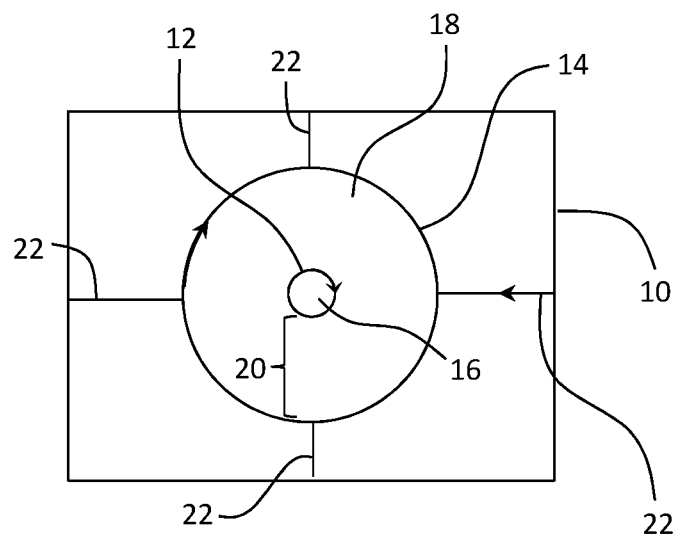
FIG. 1 is an illustration of an article including both outer and inner contours to be cut from a starting parent substrate, the outer contour circumscribing the article and the inner contour circumscribing a plug to be removed from the article.

Disclosed herein is a process for cutting and removing one or more articles from a thin substrate of brittle material, for example a thin transparent material. The material may be, for example, a transparent glass material, a transparent glass ceramic material or a transparent ceramic material. The process is particularly useful for cutting and removing interior contoured shapes from thin substrates of transparent glass. The method utilizes an ultra-short duration pulsed laser beam and accompanying optics to form defects in the substrate along a focus line in the substrate. The focus line, and the resultant defect line, may extend through the entire thickness of the substrate, although in further embodiments the focus line and the resultant defect line may extend through only a portion of the thickness of the substrate. A plurality of defect lines may be formed along a predetermined path, thereby forming a fault line. The predetermined path may be a closed path such that the predetermined path circumscribes the part to be removed, although in further embodiments the predetermined path may not be a closed path. In some embodiments, formation of the fault line may be followed by use of a laser beam, for example a $CO_2$ laser beam, that is traversed along the path to promote full separation (isolation) of the part along the fault line by heating the substrate along the fault line. The laser process described below can generate full body cuts in a variety of glasses, with low sub-surface damage (extending less than about 75 micrometers), and excellent surface average roughness (wherein an average surface roughness $R_a$ of the cleaved edge surface is equal to or less than about 0.5 micrometers). Average surface roughness is a quantitative calculation of the relative roughness of a linear profile or area, expressed as a single numeric parameter ($R_a$). Average surface roughness can be measured, for example, using an optical profilometer (e.g., white light or laser interferometry), or by contact methods (typically employing a diamond stylus). Suitable instruments are available, for example, from Zygo® and Nikon.

As used herein, sub-surface damage (SSD) is defined as the extent of cracks or "checks" perpendicular to the cut edge of the substrate. In some embodiments, depending on substrate type, separation of the substrate may be accomplished in a single pass of the pulsed laser. The magnitude of the distance these cracks extend into the substrate can determine the amount of material removal that may later be needed from grinding and polishing operations to remove edge defects and improve edge strength. SSD may be measured using, for example, a confocal microscope or a fluorescing die to observe light scattering from any cracks that may be present, and determining the maximum distance the cracks extend into the body of the substrate and/or article over a given cut edge. Alternatively, the exposed edge may be polished iteratively while examining the edge using a confocal microscope. As material is polished off, the amount of cracks evident decreases. Eventually, when all the defects are gone, the depth of material removed is reported as the sub-surface damage.

Although the following description is presented in respect of glass substrates, e.g., glass sheets, it should be recognized that embodiments of the present disclosure can be applicable to a range of transparent materials, for example glass, glass ceramic, ceramic or selected minerals (e.g., sapphire).

Ranges can be expressed herein as from "about" one particular value, and/or to "about" another particular value. When such a range is expressed, another embodiment includes from the one particular value to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as may be used herein—for example up, down, right, left, front, back, top, bottom—are made only with reference to the figures as drawn and are not intended to imply absolute orientation.

Unless otherwise expressly stated, it is not intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is not intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, transparent means the incident laser beam used to form defect lines loses no more than 10% of the impinging energy per millimeter of distance propagated within the substrate in the linear absorption regime.

As used herein, the term defect refers to cracks, including microcracks, and other bond-breaking damage to the molecular structure of a substrate. Defects may include mechanical damage, such as by contact of the substrate to mechanical objects, or the damage may be the result of interaction of the material with electromagnetic fields, such as a laser beam.

As used herein, a defect line refers to a linear defect (a single long defect or a series of defects arrayed in a line), typically, although not exclusively, extending in a thickness direction of the substrate (orthogonal to the major surfaces of the substrate).

As used herein, a contour or path refers to a virtual two dimensional shape on a substrate. Thus, while a path itself is a virtual shape, the path may be approximated, for example, by a fault line or a crack. A closed path is a path that forms a continuous loop, the loop circumscribing and bounding an interior area. A path may be followed, for example, by a laser beam impinging on the surface of the substrate.

As used herein, a fault line refers to a series of closely spaced defect lines positioned along a path. Similarly, a release line is a fault line typically extending from an edge of the substrate to a fault line defining an interior shape, or between two fault lines defining interior shapes. Accordingly, while release lines are fault lines, as used herein the term fault line will be used to describe shapes internal to the glass substrate (not intersecting an edge of the substrate), whereas release lines will denote fault lines extending from an edge of the substrate to an interior fault line, or from one interior fault line to another interior fault line.

As used herein, the term separation refers to a disruption in a material (e.g., damage), such as a crack or other defect (generically, a cleave), that forms two opposing surfaces. Separation, then, should be interpreted as cleaving that does not result in the complete isolation of one portion of the substrate bounded by the cleave from another, adjacent portion of the substrate. In contrast, isolation refers to a cleave that extends completely through the substrate along a predetermined path that results in complete isolation of a first portion of the substrate bounded by the cleave from another portion of the substrate adjacent to the first portion such that the first portion is independently movable relative to the adjacent portion. A cleave that results in isolation, for example, may extend completely around a closed path (i.e., a closed contour) in a substrate and further extending completely through the thickness of the substrate. Such a cleave defines an interior portion of the material completely isolated from a portion of the material outside the closed path, such that the inner portion is capable of motion independent of the surrounding portion outer. It should be noted, however, that isolation need not require a cleave about a closed path.

Embodiments described herein relate a method to cut transparent materials into one or more articles with specific predetermined contoured shapes, using cutting, isolation and removal processes that expose the high quality edge generated by the above-mentioned processes without damaging the article by the isolation and removal processes. FIG. 1 illustrates a parent glass substrate 10. Also shown is a first, inner, predetermined path 12 and a second, outer (relative to inner path 12), predetermined path 14, wherein both first and second paths represent closed paths. In the illustrated embodiment, first and second paths 12, 14 are circular paths, where second path 14 is concentric with first path 12, although in further embodiments the first and second paths need not be circular. In accordance with the embodiment of FIG. 1, first path 12 defines a first disc, hereinafter plug 16, comprising a first radius r1, and second path 14 defining a second disc 18 comprising a second radius r2. First path 12 and second path 14 define an annulus 20 therebetween. That is, annulus 20, which is the article to be obtained, is second disc 18 removed from the surrounding material of substrate 10 and with plug 16 removed from second disc 18. Accordingly, annulus 20 must be freed from the surrounding portion of substrate 10, and plug 16 must be removed from the surrounding material of second disc 18. Release (removal) of annulus 20 from substrate 10 can be accomplished using a cut around second path 14, and additional cuts (release lines) along paths 22 that ease the process for removing the annulus. However, for interior portions of substrate 10, such as plug 16, no such cuts can be made as such cuts would damage the surrounding annulus, which in the present example is the commercial part of interest. Additionally, the processes described herein produce cuts with essentially zero kerf. Thus, while plug 16 may be isolated from the surrounding material and thereby capable of moving independently, the plug remains captured within the annulus. The plug may be forced from the annulus, but with a high likelihood that damage to the annulus will occur.

While the present disclosure describes in detail removal of both plug 16 from second disc 18 to form a subsequent circular hole therein, and removal of annulus 20 from the glass substrate, methods described herein may be used to remove a broad variety of articles of arbitrary shapes, including without limitation regular geometric shapes, such as circular, triangular, rectangular or slot shaped. Articles removed from the substrate may have radiused corners, or the corners may be sharp (e.g., edges that intersect at an angle) features.

The challenge with forming an interior closed cut in a glass substrate and removing the resultant interior part to form an opening, for example a central spindle hole in a memory disk substrate, is that, even if suitable closely-spaced defect lines are produced along a closed, predetermined path to form a fault line, and a crack propagates around the path intersecting the defect lines, thereby isolating the interior part from the surrounding material, the cutting process is an essentially zero-kerf process. That is, the typical defect line produced by the process is about 1 micrometer in diameter, and the surface-to-surface separation at the intervening crack between defect lines is essentially zero. Accordingly, even if the interior part can be moved, it may catch against an edge of the surrounding material and cause chipping of the part, the surrounding material, or both if removal is attempted. Thus, when removing plug 16 from second disc 18 to form annulus 20, removal of the plug may damage the annulus. A challenging aspect of automating a separation and removal process is incorporating steps that allow the isolated interior part to drop from the surrounding material without damage to the surrounding material. In respect of disc 18, this is true for both the plug removed from the center of the second disc and the annulus portion itself. That is, damage to annulus 20 is to be avoided both when removing plug 16 from disc 18 and when removing annulus 20 from the surrounding substrate material. The problem exists regardless of whether the material to be cut exhibits high internal stress and is easy to form cracks in, for example a chemically strengthened glass substrate like Gorilla® Glass, or if the material is low stress, for example a glass substrate suitable for forming a display panel, such as Eagle XG® glass, Corning Lotus™, Lotus™ XT, and/or Lotus™ NXT glass. As used herein, high stress glass is a glass having a central tension (in a thickness direction of the glass) equal to or greater than about 24 megaPascal (MPa). A low stress glass typically has a central tension less than about 24 MPa. While Gorilla® Glass, Eagle XG® glass, Corning Lotus™, Lotus™ XT, and/or Lotus™ NXT glass have been specifically mentioned herein, the claims appended herewith should not be so limited, as exemplary processes and methods are applicable to other glasses, such as alkaline earth boro-aluminosilicate glasses (with low or no alkali), aluminosilicate glasses, alkali earth-containing glasses, and the like.

As described supra, the present disclosure is generally directed to a method and apparatus for cutting and removing portions of a glass substrate. However, in particular embodiments, the present disclosure is directed to a laser method and apparatus for precision cutting, isolation and removal of arbitrarily shaped articles from glass substrates in a controllable fashion, with negligible debris and minimal damage to cut edges that preserves the strength of the article. The resultant article may require only minimal or even no edge finishing (grinding and/or polishing), and in certain embodiments, may involve minimal or no finishing of major surfaces of the article. The method relies on the substrate material transparency and linear optical absorption at the wavelength of the laser used to form the defect lines at low laser beam intensity, which allows maintenance of a clean and pristine surface quality, and on the non-linear absorption induced by high laser beam intensity along the laser focus line. A key enabler of this process is the high aspect ratio of the defect created by the ultra-short pulsed laser beam that allows creation of a defect line extending between the major surfaces of the material to be cut. In principle, this defect line can be created by a single laser pulse. However, if necessary, additional pulses can be used to increase the size of the affected area (e.g., depth and width).

Using a short pulse picosecond laser and accompanying optics that generate a focal line along the laser beam longitudinal axis (i.e., in the direction of beam propagation), a series of defect lines can be formed at closely-spaced intervals along a predetermined path, or contour, on a substrate, the defect lines extending through at least a portion of the thickness of the substrate, e.g., a glass sheet. Defect lines are typically less than a few micrometers in diameter. A series of defect lines along a path are referred to as a fault line, and the series of defect lines can be joined by a series of defect-line-to-defect-line cracks, either self-formed due to existing stress in the substrate or due to stress induced by subsequent exposure to a heat source, for example a second laser beam, to thereby isolate one portion of the substrate from another portion of the substrate.

The optical method of forming a line focus can take multiple forms, for example using donut shaped laser beams and spherical lenses, axicon lenses, diffractive elements, or other methods to form the linear region of high intensity. The type of laser (picosecond, femtosecond, etc.) and wavelength (IR, green, UV, etc.) can also be varied, as long as sufficient optical intensities are reached to create breakdown of the substrate material. The laser wavelength is typically chosen so that the substrate (e.g., glass sheet) is highly transparent to the radiation. In the case of glass, 1064 nanometer light is a commonly preferred wavelength, where high intensity pulsed lasers such as those using Nd:YVO$_4$ as the gain medium are available. When the laser pulse passes through these optics, the optical energy is formed into a linear region of high intensity that can be extended through entire thickness of the substrate. More generally, the selected wavelength may be in a range from about 2 micrometers to about 11 micrometers, for example, about 10.6 micrometers, 5.32 micrometers, 3.55 micrometers or 2.66 micrometers, although other wavelengths may be suitable depending on the material.

In some embodiments, the pulse duration of the individual pulses can be in a range from about 0.1 picoseconds to about 100 picoseconds, such as in a range from about 5 picoseconds to about 20 picoseconds, and the repetition rate of the individual pulses can be in a range from about 1 kHz to about 4 MHz, such as in a range from about 10 kHz to about 650 kHz. As the frequency increases, the speed with which the process can operate increases. However, as the frequency increases, the energy per pulse decreases.

The laser creates defect lines that penetrate the glass substrate. A defect line may include microcracking, but may also include internal openings or voids, for example, of approximately 1 micrometer in diameter. These defect lines are generally spaced from about 1 to about 20 micrometers apart, for example, in a range from about 0.5 to about 15 micrometers, in a range from about 0.5 micrometers to about 3 micrometers, or in a range from about 3 micrometers to about 10 micrometers. For example, in some embodiments the periodicity between adjacent defect lines can be between 0.5 micrometers and 1.0 micrometers. The defect lines can extend, for example, through the entire thickness of the glass substrate, and are typically perpendicular to the major (flat) surfaces of the substrate, although in further embodiments, the defect lines may extend through only a portion of the substrate thickness. Moreover, in some embodiments the defect lines may be produced at an angle to the major surfaces of the substrate, for example if chamfered edges are desired on annulus 20.

In addition to a single pulse operation at the aforementioned individual pulse repetition rates, the pulses can be produced in bursts of two or more pulses (e.g., 3 pulses, 4 pulses, 5 pulses, 10 pulses, 15 pulses, 20 pulses, or more) separated by a duration between the individual pulses within the pulse burst that is in a range from about 1 nanosecond to about 50 nanoseconds, for example in a range from about 10 nanoseconds to about 50 nanoseconds, in a range from about 10 nanoseconds to about 30 nanoseconds, for example about 20 nanoseconds, and the burst repetition frequency can be in a range from about 1 kilohertz to about 4 Mhz. For a given laser, the time separation $T_p$ between adjacent pulses (pulse-to-pulse separation) within a burst is relatively uniform (e.g., ±10%). For example, for a laser that produces a pulse separation $T_p$ of about 20 nanoseconds, the pulse-to-pulse separation $T_p$ within a burst can be maintained within about ±10%, or about ±2 nanoseconds. The time between each "burst" of pulses (i.e., time separation $T_b$ between bursts) will be much longer (e.g., $0.25 \leq T_b \leq 1000$ microseconds, for example in a range from about 1 microsecond to about 10 microseconds, or in a range from about 3 microseconds to about 8 microseconds). In exemplary embodiments, the time separation $T_b$ can be about 5 microseconds for a laser with a pulse burst repetition rate, or frequency, of about 200 kHz. The laser burst repetition rate is related to the time $T_b$ between the first pulse in a burst to the first pulse in the subsequent burst (laser burst repetition rate=$1/T_b$).

In some embodiments, the laser burst repetition frequency may be in a range from about 1 kHz to about 650 kHz. For example, the laser burst repetition rates can be, for example, in a range from about 1 kHz to about 300 kHz. The time $T_b$ between the first pulse in each burst to the first pulse in the subsequent burst may be in a range from about 0.25 microseconds (4 MHz burst repetition rate) to about 1000 microseconds (1 kHz burst repetition rate), for example in a range from about 0.5 microseconds (2 MHz burst repetition rate) to about 40 microseconds (25 kHz burst repetition rate), or in a range from about 2 microseconds (500 kHz burst repetition rate) to about 20 microseconds (50 k Hz burst repetition rate). Individual pulses may have pulse durations $T_d$ of up to 100 picoseconds (for example, 0.1 picoseconds, 5 picoseconds, 10 picoseconds, 15 picoseconds, 18 picoseconds, 20 picoseconds, 22 picoseconds, 25 picoseconds, 30 picoseconds, 50 picoseconds, 75 picoseconds, including all ranges and subranges therebetween). The energy or intensity of each individual pulse within the burst may not be equal to that of other pulses within the burst, and the intensity distribution of the multiple pulses within a burst may in some embodiments follow an exponential decay in time governed by the laser design, although in other embodiments decay may not be evident. The exact timing, pulse duration, and burst repetition rate can vary depending on the laser design, but short pulses ($T_d$<20 picoseconds and preferably $T_d \leq 15$ picoseconds) of high intensity have been shown to work particularly well.

The average laser energy per burst measured at the substrate material can be greater than 40 microJoules per millimeter thickness of material, for example in a range from about 40 microJoules/mm to about 2500 microJoules/mm, for example from about 200 microJoules/mm to about 800 microJoules/mm. Put another way, the energy per burst is typically in a range from about 25 microJoules to about 750 microJoules, for example in a range from about 50 microJoules to about 500 microJoules, or in a range from about 50 microJoules to about 250 microJoules, including all ranges and subranges therebetween. In some embodiments, the energy per burst can be in a range from about 100 microJoules to about 250 microJoules. For example, for Corning 2320 non-ion exchanged glass with a thickness in a range from about 0.5 millimeters to about 0.7 millimeters, 200 microJoule pulse bursts can be used to cut and separate the glass, which gives an exemplary range of about 285 micro- Joules/mm to about 400 microJoules/mm. Relative motion between the substrate and the laser beam can then be used to create a fault line comprising a series of defect lines that trace out the shape of any desired part or parts (e.g., a plug).

For alkaline earth boro-aluminosilicate glasses (with low or no alkali) in particular, volumetric energy densities within of about 0.005 microJoules/micrometer$^3$ or higher can ensure a defect line is formed. However, such energy densities should be kept below about 0.100 microJoules/micrometer$^3$ so as to incur only minimal damage to the glass, for example in a range from about 0.005 microJoules/micrometer$^3$ to about 0.100 microJoules/micrometer$^3$.

The energy of an individual pulse within the pulse burst will be less than the foregoing, and the exact individual laser pulse energy will depend on the number of pulses within the pulse burst and the rate of decay (e.g., exponential decay rate), if any, of the laser pulses with time. For example, for a constant energy per burst, if a pulse burst contains 10 individual laser pulses, then each individual laser pulse will contain less energy than if the same pulse burst had only 2 individual laser pulses.

The use of a laser capable of generating such pulse bursts is advantageous for cutting or modifying transparent materials, for example glass. In contrast with the use of single pulses spaced apart in time by the repetition rate of the single-pulse laser, the use of a pulse burst sequence that spreads the laser energy over a rapid sequence of pulses within the burst allows access to larger timescales of high intensity interaction with the substrate material than is possible with single-pulse lasers. While a single-pulse can be expanded in time, the intensity within the pulse must drop as roughly one over the pulse width. Hence, if a 10 picosecond single pulse is expanded to a 10 nanosecond pulse, the intensity drops by roughly three orders of magnitude. Such a reduction can reduce the optical intensity to a point where non-linear absorption is no longer significant, and the light-material interaction is no longer strong enough to allow for cutting. In contrast, with a pulse burst laser, the intensity during each pulse within the burst can remain very high—for example three 10 picosecond pulses spaced apart in time by approximately 10 nanoseconds still allows the intensity within each pulse to be approximately three times higher than that of a single 10 picosecond pulse. Thus, the laser can interact with the substrate over a timescale that is now three orders of magnitude longer. This adjustment of multiple pulses within a burst allows for a manipulation of the time-scale of the laser-material interaction in ways that can facilitate greater or lesser light interaction with a pre-existing plasma plume, greater or lesser light-material interaction with atoms and molecules that have been pre-excited by an initial or previous laser pulse, and greater or lesser heating effects within the material that can promote the controlled growth of microcracks. The required amount of burst energy to modify the material will depend on the substrate material composition and the characteristics of the line focus used to interact with the substrate. The longer the interaction region, the more the energy is spread out, and higher burst energy will be required. A defect line is formed in the substrate when a single burst of pulses strikes essentially the same location on the substrate. That is, multiple laser pulses within a single burst correspond to a single defect line in the substrate. Of course, since the substrate is translated (for example by a constantly moving stage), or the beam is moved relative to the substrate, the individual pulses within the burst cannot be at exactly the same location on the substrate. However, the individual pulses are well within 1 micrometer of one another, i.e., they strike the substrate at essentially the same location. For example, the individual pulses may strike the substrate at a spacing, sp, from one another where 0<sp≤500 nanometers. For example, when a substrate location is hit with a burst of 20 pulses, the individual pulses within the burst strike the substrate within 250 nm of each other. Thus, in some embodiments, the spacing sp may be in a range from about 1 nanometer to about 250 nanometers, for example in a range from about 1 nanometer to about 100 nanometers.

In some embodiments, an ultra-short (e.g., 10 picosecond) burst pulsed laser can be used to create a high aspect ratio defect line in a consistent, controllable and repeatable manner. The details of an exemplary optical setup that can be used to create suitable defect lines is described below and in U.S. Application No. 61/752,489, filed on Jan. 15, 2013, the content of which is incorporated herein by reference in its entirety. The essence of this concept is to use an axicon lens element in an optical lens assembly to create a region of high aspect ratio taper-free defect lines using ultra-short (pico-seconds or femtosecond duration) Bessel beams. In other words, the axicon and other associated optical components condense the laser beam into a region of generally cylindrical shape and high aspect ratio (long length and small diameter). Due to the high intensity created within the condensed laser beam, nonlinear interaction of the laser electromagnetic field and the substrate material occurs and the laser energy is transferred to the substrate. However, in areas where the laser energy intensity is not sufficiently high (e.g., glass surface, glass volume surrounding the central convergence line), nothing happens to the substrate as the laser intensity in those locations is below both the linear and nonlinear threshold.

Figure 2:
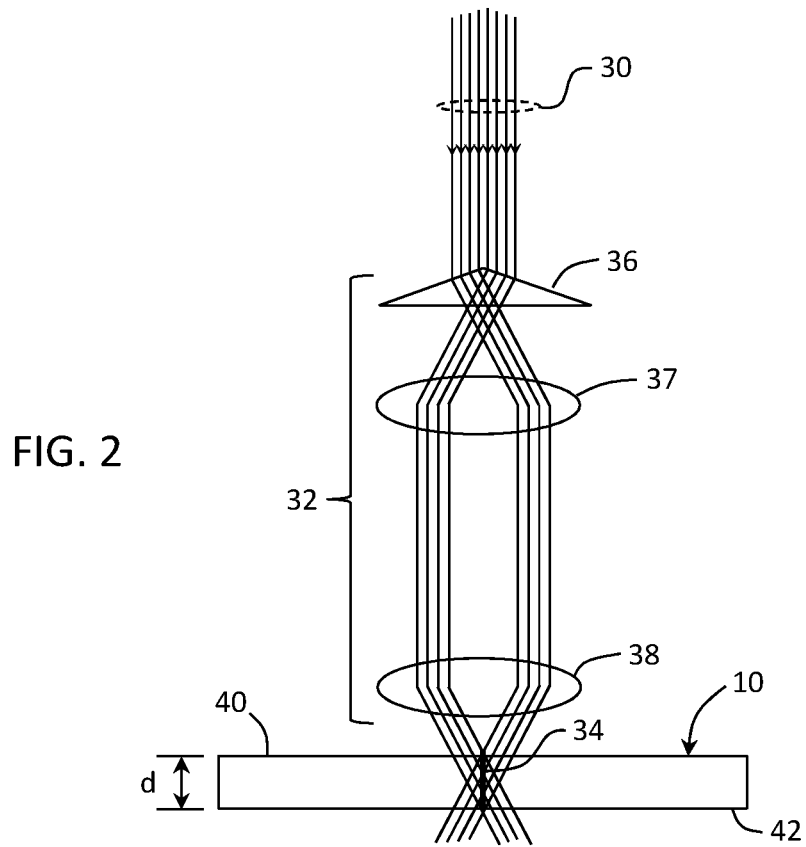
FIG. 2 is a schematic diagram showing an exemplary optical arrangement to produce a focal line within a substrate.

As shown in FIG. 2, a laser (not shown) emits laser beam 30 at the beam incidence side of optical assembly 32. The optical assembly 32 converts laser beam 30 into an extended laser beam focal line 34 on the output side of optical assembly 32 over a defined distance along the laser beam axis. Those skilled in the art will recognize that changes in the length of focal line 34 can occur due to changes in the refractive index, for example between air propagation and propagation in the substrate. The substrate 10 is positioned in the beam path, after the optical assembly 32, overlapping at least partially the laser beam focal line 34. Optical assembly 32 may include, for example, an axicon 36, a collimating lens 37 and a focusing lens 38. Reference numeral 40 designates the major surface of the substrate facing optical assembly 32, while reference numeral 42 designates the opposing major surface of substrate 10, usually parallel with major surface 40. The substrate thickness (measured perpendicular to the surfaces 40 and 42) is labeled d.

Optical assembly 32 forms what is termed a quasi-non-diffracting beam, which is a beam that diffracts or spreads much less rapidly than conventional Gaussian laser beams. These optics are most often used to create what is termed a Gauss-Bessel beam, which is one form of a non-diffracting beam that can maintain a tight focus over a length easily 100×, or even 1000× longer than a traditional Gaussian beam.

In the overlapping area of the laser beam focal line 34 with substrate 10, the laser beam focal line 34 generates (assuming suitable laser intensity along the laser beam focal line 34) an induced absorption (non-linear absorption) in the substrate material that produces a defect line in the substrate material. Defect formation is not only local to the region of the focal line, but occurs over the entire length of the focal line within substrate 10. The average diameter of the laser beam focal line 34 may be, for example, in a range from about 0.1 micrometers to about 5 micrometers, for example in a range from about 0.1 micrometers to about 4 micrometers, for example in a range from about 0.1 micrometers to about 3 micrometers, for example in a range from about 0.1 micrometers to about 2 micrometers, for example in a range from about 0.1 micrometers to about 1 micrometer, while the focal region extends for millimeters in length (e.g., in a range from about 0.5 to about 10 millimeters).

Figure 3:
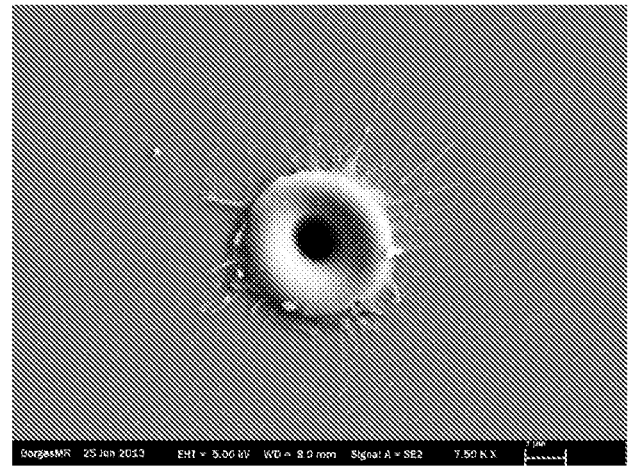
FIG. 3 is a scanning electron microscope image showing a top view of a defect line formed in a glass substrate, illustrating an initial hole and a rim about the hole with ejecta evident.
Figure 4:
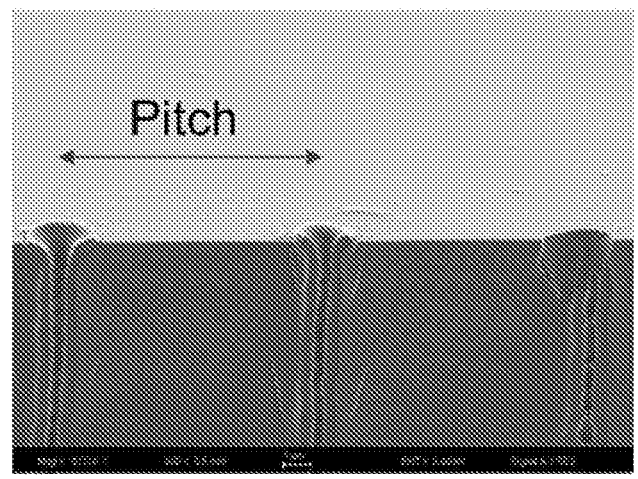
FIG. 4 is a scanning electron microscope image that is a cross sectional view of a glass substrate showing several defect lines formed in a glass substrate.

As the foregoing shows, substrate material that is otherwise transparent at the wavelength $\lambda$ of laser beam 30 is heated due to the induced nonlinear absorption along the focal line 34 to form a defect line. The above described process creates a piece with very characteristic edges comprised of vertical striations. Each striation is the signature of a single laser pulse, or a single burst of laser pulses and represents a portion of a defect line. As with the defect lines, these stria can be periodically spaced approximately every 1 to 50 micrometers apart, for example every 1 to 20 micrometers apart, for example in a range from about 5 to about 15 micrometers apart. The stria represents a modification of the substrate material by the focused laser energy, which results in a long linear damage track (the defect line) parallel to the laser beam axis. The substrate material in that region can be densified or chemically altered. The defect line generally includes cracks emerging therefrom that can extend approximately 5 to 10 micrometers radially into the substrate, or in some cases up to 25 micrometers, with the size of the crack generally being proportional to the amount of laser energy deposited in the material. A defect line may have open regions, but is generally not a continuous hole through the thickness of the substrate. At the top and bottom of the defect line there is frequently an open hole. The open region of the hole typically has a diameter of less than 1 micrometer, but under some conditions can be made large, such as up to 5 micrometers in diameter. The hole often has a raised area or "crater rim" of ejected and melted material that surround it, typically exhibiting a diameter in a range from about 3 micrometers to about 8 micrometers. FIG. 3 is a scanning electron microscope image of a typical defect line as seen on the surface of a glass substrate, showing the rim and ejecta. FIG. 4 is a scanning electron microscope image of the glass substrate as seen in cross section, showing a defect line along at least a portion of its length.

The use of defect lines to define the edges of a part provides high dimensional quality to the resultant article. Since the cracks that isolate the article are guided by the defect lines, the spatial precision and accuracy of the short pulse laser beam determines the direction in which the crack propagates, and, in the example of an annular shape, results in an inner and outer radius made to a micrometer level of accuracy, for example less than 25 micrometer, such as less than about 15 micrometers, and typically about +/−5 micrometers, but certainly tolerances. This is in contrast to mechanical processes, which cannot guide a crack around such a radius. It is also in contrast to other laser processes, such a $CO_2$ laser cutting, where a crack is thermally propagated by guiding it with a hot spot formed from a $CO_2$ laser beam, but is not guided by any pre-defined defects created in the substrate. The lack of guiding defects can lead to crack wander, which means such tight (micrometer level) accuracy cannot be achieved. Other laser process, such as Gaussian focused UV or visible laser ablation to form a trench or crack at the top of the substrate also suffer from poor dimensional control, as they tend to only control the crack at one surface of the glass.

In spite of surface stria, the crack face resulting from separation of the substrate should be of high quality (regarding breaking strength, geometric precision, roughness and avoidance of re-machining requirements). Surface roughness in particular results from the spot size or the spot diameter of focal line 34. To achieve a small spot size, for example 0.5 micrometers to 2 micrometers in the case of a given wavelength $\lambda$ of the laser, certain requirements are usually imposed on the input beam diameter and numerical aperture of optical assembly 32.

To achieve the required numerical aperture, the optical assembly should, on the one hand, possess the required opening for a given focal length according to the known Abbé formulae (N.A.=n sin (theta), where n represents the refractive index of the glass, theta represents the aperture half angle, and theta=arctan(D/2f); where D represents the aperture diameter and f represents focal length). On the other hand, the laser beam must illuminate the optical assembly up to the required numerical aperture, which is typically achieved by means of beam widening, for example using beam widening telescopes between the laser and the focusing optics.

The spot size should not vary too greatly for the purpose of a uniform interaction along the focal line. This can, for example, be ensured by illuminating the focusing optics only in a small, circular area so that the beam opening and thus the percentage of the numerical aperture vary only slightly. Suitable optical assemblies 32 that meet these needs and can be applied to generate focal line 34 include laser processing device CLT 45G available from Corning Laser Technologies.

It should be noted that focal line 34 can be produced and arranged such that focal line 34 lies entirely within substrate 10, crosses only one major surface, or crosses both major surfaces of the substrate. It is possible to change the focus position of the optics sufficiently to cause only a portion of the depth of the substrate to be damaged. In such a case, the striation may extend from the top of the substrate to somewhere in the middle of the substrate, or from the bottom of the substrate to somewhere in the interior of the substrate. In the instance where focal line 34 may be entirely within the bulk of the substrate, it should be recognized that surface thresholds are different than bulk thresholds, so typically entrance and exit holes are still formed in the substrate by the incident beam, then areas with no damage, and then the defect line. That is, although focal line 34 may lie entirely within the substrate, surface damage may still be present. In those cases it is still possible to separate the part from the substrate, but full control of the crack direction or separation contour may be compromised. Best results are achieved with focal line 34 extending to both major surfaces 40, 42, as this improves the ability to isolate the part of interest and minimizes variations in edge strength. Thus, it is possible to achieve virtually ideal cuts while avoiding feathering and large particle generation at the surfaces of the substrate.

Depending on the material properties (optical absorption, coefficient of thermal expansion (CTE), stress, composition, etc.) and laser parameters chosen for processing the selected substrate material, the creation of a fault line alone can be enough to induce separation, and in some cases isolation of the article. Self-separation and/or self-isolation may occur as spontaneous events, without the addition of external mechanical force. This is the case for most strengthened glasses (those having already undergone ion-exchange before cutting) that have significant (i.e., equal to or greater than about 24 MPa) internal or central tension (CT). In this case, secondary processes, such as mechanically applied tension (e.g., bending) forces or heating (e.g., with a laser beam) are generally not necessary to promote isolation (although not plug removal).

The foregoing notwithstanding, in some cases, pre-existing stresses, or stresses formed during creation of the fault line may not be sufficient to isolate the interior part automatically. The insufficiency of fault line formation itself to induce isolation is often the case for non-strengthened glasses with insufficient residual stress, such as display-type glass like Eagle XG®, Lotus™, Lotus™ XT, and/or Lotus™ NXT or otherwise ion-exchangeable glasses that are cut before any ion-exchange step. Thus, a secondary process step may be necessary to promote isolation. For example, isolation can be achieved, after the creation of a fault line, by application of mechanical force or by re-tracing the previous path followed during creation of the fault line with an infrared laser beam (e.g., $CO_2$ or CO laser beam) to locally heat the substrate along the path and create sufficient thermal stress, without ablation, to force the parts to isolate. That is, to create one or more full-body cracks along the fault line that then isolate the internal part. Another option is to have the laser only start separation, for example by only partially traversing the predetermined path, wherein isolation is performed manually, for example by bending or by other applications of force. The optional laser separation can be performed with a defocused continuous wave $CO_2$ laser emitting at a wavelength in a range from about 9 micrometers to about 11 micrometers, for example 10.6 micrometers, and with power adjusted by controlling the laser duty cycle, although in further embodiments, other wavelengths and laser mediums may be used (for example a CO laser). Focus change (i.e., extent of defocusing) can be used to vary the induced thermal stress by varying the spot size of the laser beam on the surface of the substrate, where the spot size is defined as $1/e^2$ of the peak intensity. After generation of the fault line, laser induced separation and isolation can generally be achieved using a power at the substrate surface in a range from about 40 watts to 400 watts, a spot size in a range from about 2 millimeters to about 12 millimeters, and a traverse rate of the laser beam along the fault line of in a range from about 50 millimeters/second to about 3000 millimeters/second, for example in a range from about 80 millimeters/second to about 500 millimeters/second. If the spot size is too small (i.e., less than about 1 millimeter), or the laser power is too high (greater than about 400 watts), or the scanning speed is too slow (less than about 1 millimeter/second), the substrate may be over heated, creating ablation, melting or thermally generated cracks, which are undesirable because they can reduce the edge strength of the separated parts. Preferably the laser beam scanning speed is greater than about 50 millimeter/second to induce efficient and reliable part separation. However, if the spot size created by the laser is too large (greater than about 20 millimeters), or the laser power is too low (less than about 10 watts, or in some cases less than about 30 watts), or the scanning speed is too high (greater than about 500 millimeters/second), insufficient heating can occur, which may result in a thermal stress too low to induce reliable part separation.

In some embodiments, a $CO_2$ laser operating at a power of 200 watts may be used, with a spot diameter at the glass surface of approximately 6 millimeters, and a scanning speed of about 250 millimeters/sec to induce part separation for 0.7 millimeter thick Corning Eagle XG® glass that has been modified with the above-described picosecond laser. A thicker substrate may require more laser thermal energy per unit time to separate than a thinner substrate, or a substrate with a lower CTE may require more $CO_2$ laser thermal energy to separate than a substrate with a lower CTE. Separation along the fault line can occur very quickly (e.g., within about 1 second) before or after the laser spot passes a given location, for example within 100 milliseconds, within 50 milliseconds, or even within 25 milliseconds.

However, even if the substrate has sufficient internal stress to start self-separation or self-isolation after the formation of the fault line, the geometry of the part may prevent the part from being easily removed from the surrounding substrate material. This is especially true when the part to be removed is an interior portion of another part, for example plug 16. Accordingly, the plug may remain in place due to lack of sufficient clearance (gap) between the plug and the surrounding substrate material. Cracks may propagate between the defect lines that isolate the plug, but no room exists between the plug and the surrounding substrate material to allow the plug to be removed from the parent substrate material without damage to the surrounding material. Release lines will only destroy the surrounding part of interest.

Figure 5:
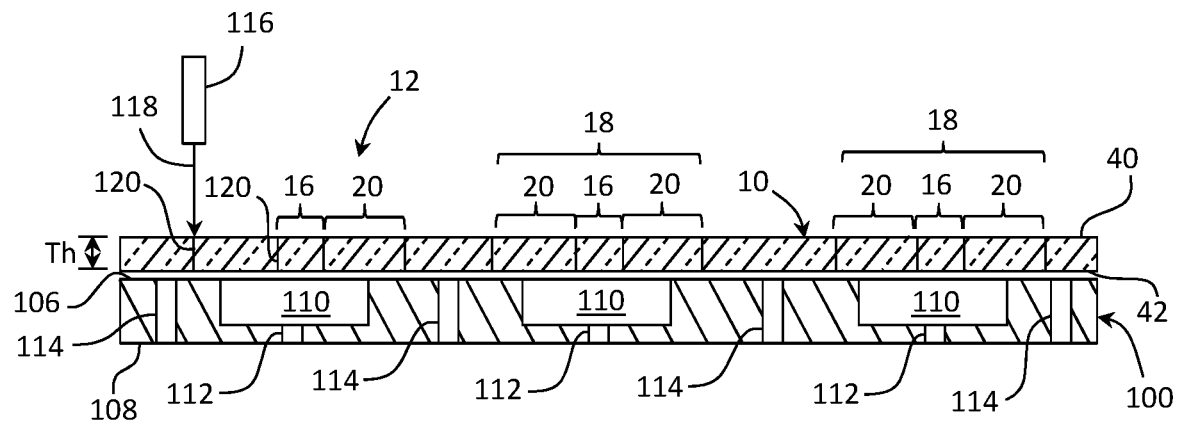
FIG. 5 is a schematic diagram of a substrate positioned on a substrate support, wherein one or more lasers are used to create defect lines, and subsequent fault lines, in a substrate.
Figure 6:
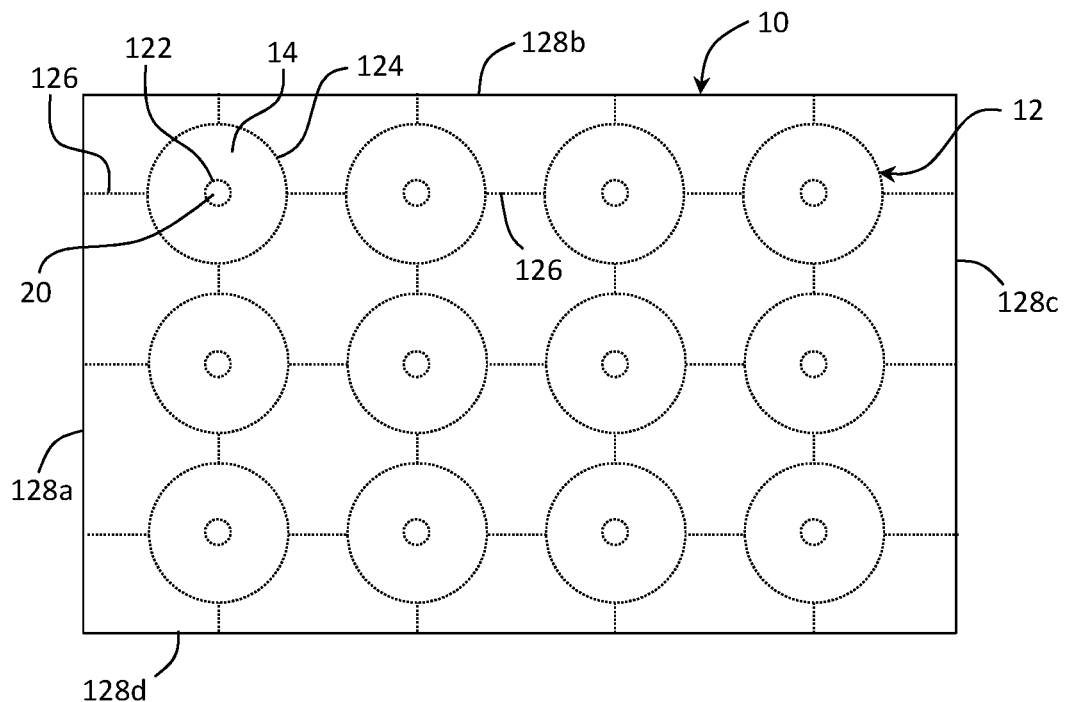
FIG. 6 is a top view of a substrate comprising a plurality of fault lines defining a plurality of parts to be removed from the substrate.

Referring now to FIGS. 5 and 6, a method will now be described for cutting and removing an article from a glass substrate 10, although it should be understood that the method can be applied to other substrate materials. The method may include a step of positioning a parent glass substrate 10 on a planar supporting substrate 100. The glass substrate thickness d may be in a range from about 50 micrometers to about 3 millimeters, for example in a range from about 100 micrometers to about 2 millimeters, for example in a range from about 300 micrometers to about 1 millimeters. For example, in some embodiments, the glass substrate may have a thickness in a range from about 0.5 millimeters to about 0.7 millimeters. Preferably, glass substrate 10 is a fusion-formed glass substrate, wherein first and second major surfaces 40, 42 have not been ground or polished prior to forming defect lines in the glass substrate, although in further embodiments the glass substrate may include first and second major surfaces that have been ground and/or polished, and in further embodiments, the glass substrate 10 may be formed by other forming processes, including without limitation, float and slot forming processes. The two surfaces of a glass substrate formed by the fusion process are typically not in contact with mechanical handling surfaces while the glass is at high temperature. This leads to the ability to form large sheets of glass with pristine surfaces, without the need for polishing to remove surface contamination or other defects. The surfaces of fusion formed glass substrates have no polishing marks, and no concentrations of Sn near the glass edges. The surface roughness of fusion formed sheets is typically less than 1 nanometer Ra, but frequently is less than about 0.5 nanometer Ra.

In contrast, glass made using a conventional float process has one side that is exposed to molten tin (Sn) during the forming process. While the float glass process often can create glass at lower cost than the fusion draw process, it has a number of drawbacks. The presence of tin creates a contaminant or chemical signature within the glass sheet. Furthermore, the float process does not make glass that is as smooth as the fusion draw process. This means the Sn side must be polished to meet final roughness criteria, and also to remove the Sn contaminant itself. For at least the above reasons, it is preferred to employ fusion formed glass sheets.

In embodiments, glass substrate 10 may comprise a coefficient of thermal expansion in a range from about $30 \times 10^{-7}/° C.$ to about $40 \times 10^{-7}/° C.$ over a temperature range from about 0° C. to about 300° C., for example in a range from about 30×10⁻⁷/° C. to about 40×10⁻⁷/° C., for example in a range from about 30×10⁻⁷/° C. to about 36×10⁻⁷/° C., including all ranges and subranges therebetween. An anneal point of the glass substrate can be equal to or greater than about 700° C., for example equal to or greater than about 800° C. In some embodiments, an anneal point of the glass substrate is in a range from about 700° C. to about 820° C., for example in a range from about 710° C. to about 730° C., while in other embodiments an anneal point of the glass substrate can be in a range from about 800° C. to about 810° C. Anneal point can be measured, for example, using ASTM C336 (fiber elongation) or ASTM C598 (beam bending). In embodiments, the glass substrate comprises a compaction equal to or less than about 35 ppm after being subjected to a temperature of 600° C. for 30 minutes and allowed to cool to room temperature (23° C.), for example less than about 20 ppm. Compaction may be measured by placing multiple fiducial markings on the substrate, and subjecting the substrate to a thermal cycle, and then measuring the relative positional change or shrinkage between the fiducial markings.

In embodiments, an average surface roughness (Ra) of the glass substrate (major surfaces), prior to any grinding or polishing, is equal to or less than about 0.5 nm. The glass substrate may comprise tin on an oxide basis ($SnO_2$) in an amount equal to or less than about 0.5 wt. %, for example equal to or less than about 0.3 wt. %, for example equal to or less than about 0.2 wt. %. In some embodiments the glass substrate may comprise less than about 0.15 wt. % $SnO_2$, although in further embodiments the glass substrate may comprise essentially no $SnO_2$. The glass substrate may in some embodiments include a density equal to or greater than about 25 grams/cm³, and a Young's modulus in a range from about 75 GPa to about 90 GPa, for example in a range from about 80 GPa to about 85 GPa, for example in a range from about 82 GPa to about 84 GPa, including all ranges and subranges therebetween. Glass density can be measured using a calculating digital density meter. Young's modulus can be measured using ASTM E111, e.g., E111-04(2010). The glass substrate may comprise a softening temperature in a range from about 900° C. to about 1100° C., for example in a range from about 950° C. to about 1050° C., for example in a range from about 970° C. to about 1050° C., for example in a range from about 1025° C. to about 1050° C., for example in a range from about 1040° C. to about 1050° C. In some embodiments, the glass substrate may include a softening temperature in a range from about 1040° C. to about 1050° C., including all ranges and subranges therebetween. The softening temperature can be measured, for example, using ASTM C338.

The glass is preferably free of alkali metal oxides, since alkali metals can migrate over time and with high temperature exposure, causing chemical contamination and poisoning of other layers in the system such as the magnetic layers of the hard disk. For example, in some embodiments the glass is an alkali metal oxide free aluminoborosilicate glass. As used herein, alkali metal oxide free means equal to or less than about 0.1 wt. % alkali metal oxide. The glass preferably contains substantially no $As_2O_3$, wherein the phrase "contains substantially no $As_2O_3$" means that no $As_2O_3$ is contained other than that originating, as impurities, from raw materials, or the like, and the content of $As_2O_3$ in a glass composition is 0.1% by weight or lower (preferably, 50 ppm or lower). The glass preferably contains substantially no $Sb_2O_3$, wherein the phrase "contains substantially no $Sb_2O_3$" means that no $Sb_2O_3$ is contained other than that originating, as impurities, from raw materials, or the like, and the content of $Sb_2O_3$ in a glass composition is 0.1% by weight or lower (preferably, 50 ppm or lower).

Support substrate 100 comprises a first major surface 106 and a second major surface 108, wherein second major surface 104 of glass substrate 10 is positioned on first major surface 106 of support substrate 100. Support substrate 100 is shown separated from glass substrate 10 in FIGS. 5, 10, 11 and 12 for clarity only—in practice the glass substrate may be positioned directly on top of the support substrate. Support substrate 100 can include one or more recesses 110 in surface 106 such that when parent glass substrate 10 is positioned on support substrate 100, the location of inner predetermined contours located on the parent glass substrate 10 are positioned over respective recesses. That is, a recess 110 can be positioned beneath each location on parent glass substrate 10 at which an inner fault line will be formed. Each recess 110 can serve several purposes. First, the recesses 110 can provide a gap between the portions of the glass substrate 10 that are heated during subsequent processing. In some embodiments, support substrate 100 may comprise a suitable polymer material to prevent marring and damage to the glass substrate. The polymer material may include a low melting temperature and thus be easily damaged by heat. Alternatively, the polymer material may include a high melting temperature such that the polymer is unaffected by heating.

Second, recesses 110 provide a region that can capture a plug 16 defined by the inner fault line as the plug is released from the glass substrate. In addition, each recess 110 may optionally include a passage 112 extending from a floor or bottom of the recess to the opposite surface of the support substrate, e.g., surface 108. Passage 112 may be in fluid communication with a vacuum source (not shown), so that a vacuum can be applied to the recesses to aid in removal of plug 16 from the glass substrate 10. Moreover, support substrate 100 may include additional passages 114 positioned outside recess 110. The additional passages 114 may also be placed in fluid communication with a vacuum source (not shown), which vacuum, when applied to the additional passages 114, aids in securing or otherwise fixing a position of glass substrate 10 to support substrate 100. The vacuum can be discontinued when glass substrate 10 is to be removed from support substrate 100. However, in other embodiments, glass substrate 10 may be secured to support substrate 100 by other fixing means, for example, and without limitation, by clamping or taping, or any other suitable fixing method known in the art. For example, in some embodiments, support substrate 100 may be held in position electrostatically.

The method may further comprise creating fault lines for the intended glass article (e.g., annulus 20) using a method or methods described herein above, wherein a pulsed laser beam is used to create a succession of defect lines along a predetermined path by producing a focus line that extends through the thickness d of the glass substrate. For example, referring to FIG. 5, laser 116 generating pulsed laser beam 118 may be used to create a succession of defect lines 120 along predetermined paths to form a plurality of fault lines, represented by dotted lines in FIG. 6. Defect lines 120 may be spaced apart from each other by a distance p in a range from about 1 micrometer to about 20 micrometers as described previously (see FIG. 7). The fault lines are coincident with the predetermined paths.

In the embodiment shown in FIGS. 5 and 6, the fault lines include a first, inner circular fault line 122 coincident with a first, inner path 12 (see FIG. 1) comprising a first radius and an second, outer circular fault line 124 coincident with a second, outer path 14 (see FIG. 1) and concentric with inner fault line 122 and further including a second radius greater than the first radius, the inner and outer fault lines approximating an annulus 20 therebetween. In embodiments, the first radius can be in a range from about 33 millimeters to about 34 millimeters and the second radius can be in a range from about 9 millimeters to about 11 millimeters. In other embodiments, the first radius can be in a range from about 47 millimeters and 48 millimeters and the second radius can be in a range from about 12 millimeters to about 13 millimeters, although in further embodiments, the first and second radii can be greater than or less than the distances cited above.

The plurality of fault lines may further include release lines 126. Release lines 126 facilitate removal of annulus 20 from the parent glass substrate 10. For example, some release lines may extend from edges 128a-128d of glass substrate 10 to outer fault lines 122. In some embodiments, inner and outer fault lines 122, 124 are created first, prior to creation of release lines 126. In the embodiment shown in FIG. 6, release lines 126 approach outer fault lines 124 at approximately 90 degrees, although in further embodiments, release lines 126 may approach outer fault lines 124 at other angles. For example, in some embodiments, release lines 126 may approach outer fault lines 124 at a shallow angle such that an individual release line is approximately tangent to an outer fault line. In the instance where a release line approaches an outer fault line approximately orthogonally, the outer fault line 124 should be formed prior to forming the approaching release line.

To illustrate why the order for creating fault lines can be important, consider the following example. There are interactions when the laser attempts to create a defect line in close proximity of another defect line. Energy in the line focus of the laser beam should be focused all the way through the thickness of the glass substrate. However, if there is an existing defect line nearby (typically within a few hundred micrometers), this defect line will intercept some of the cone of rays that form the line focus, and the defect line will scatter or obscure part of the laser energy that would otherwise focus deep in the glass and form a new defect line (the degree of interaction depends on the solid angle of the cone of rays intercepted). This may result in an incomplete defect line through the thickness of the glass substrate, and in some instances may prevent the formation of a defect line. When the glass parts are separated, an incomplete defect line, or the lack of a defect line, can result in the crack wandering. Typically this wandering is referred to as "shadowing", and can happen not only in the vicinity of pre-existing defect lines, but also in the vicinity of edges of the glass substrate. The exact proximity where shadowing effects are important depends on many things, such as the numerical aperture of the optics, the thickness of the glass substrate, the laser energy used, the glass composition, etc. Therefore, it is preferable to complete fault lines for the desired article first (e.g., inner and outer fault lines 122, 124), so that shadowing effects do not affect the ability to create well-defined fault lines for the desired article.

Once fault lines 122, 124 and release lines 126 are formed, it may be necessary to create an intersecting crack that joins each defect line along a fault line to an adjacent defect line to obtain isolation of an interior part. This is typically the case for low residual stress glass substrates, for example non-strengthened glass substrates such as non-ion-exchanged or non-thermally tempered glass substrates where insufficient residual stress exists for self-initiated crack formation. Accordingly, a heat source, for example an infrared heat source, such as an infrared laser (e.g., a $CO_2$ or CO laser), may be used to propagate a crack between adjacent defect lines. In respect of the foregoing inner and outer fault lines 122, 124, the heat source may be traversed over the fault lines to induce sufficient thermal stress into the glass substrate to drive a crack between the defect lines. For example, a laser beam from a $CO_2$ laser may be traversed along the same path used to form a particular fault line such that the laser beam is incident along the fault line, although in further embodiments, other laser types may be used. Laser heating along the fault line may be performed by developing relative motion between the glass substrate and the laser beam, either by keeping the glass substrate stationary and traversing the laser beam, by keeping the laser beam stationary and moving the glass substrate, or by moving both the glass substrate and the laser beam. For example, the laser may be positioned on a gantry capable of movement in at least two dimensions (e.g., a plane parallel with a plane of glass substrate 10), although in further embodiments, the gantry may also be capable of movement of the laser in a third dimension, i.e., perpendicular to the glass substrate major surfaces. In some embodiments, multiple lasers may be used to heat fault lines when there are many fault lines to be heated, thereby reducing process time. In some embodiments, a single laser may be employed, with a laser beam from the single laser directed to a beam splitting head that divides the laser beam into a plurality of individually controllable laser beams. Splitting the laser beam may reduce process time, but may also decrease the power to each individual laser beam, requiring greater output from the single laser source. In still other embodiments, glass substrate 10 may be placed within a heated oven to thermally shock the glass substrate and form intersecting cracks. This may also reduce process time, but may introduce greater difficulty in handing, particularly for large glass substrates.

It should be noted however, that just as in the formation of the fault lines and release lines, the order for driving the crack through the fault lines and release lines (i.e., separation) should be considered.

To illustrate why the order in which cracks are driven can be important, consider this second example. If cracks are first driven within the release lines, when the crack reaches the edge of the release line right next to an adjacent fault line, there is nothing to stop the crack. Thus the crack can continue to propagate into the part resulting in a defective part.

Figure 7:
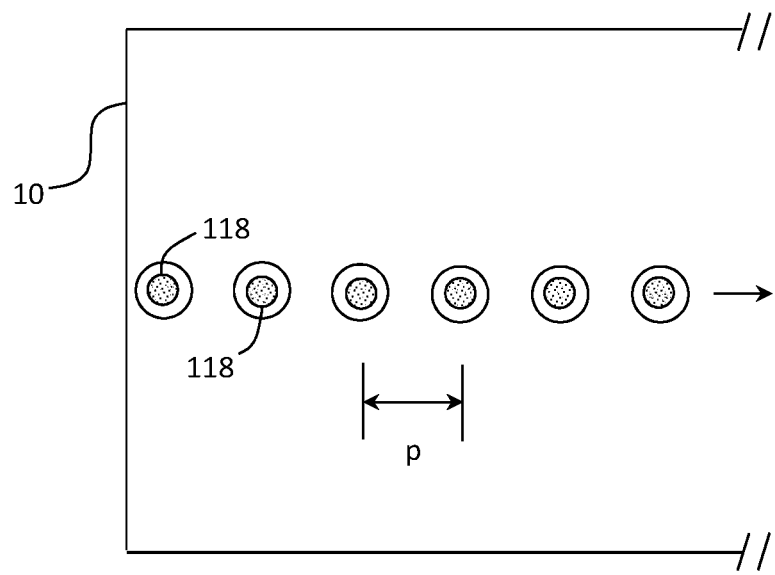
FIG. 7 is a top view of a substrate showing a plurality of defect lines formed along a path.
Figure 8:
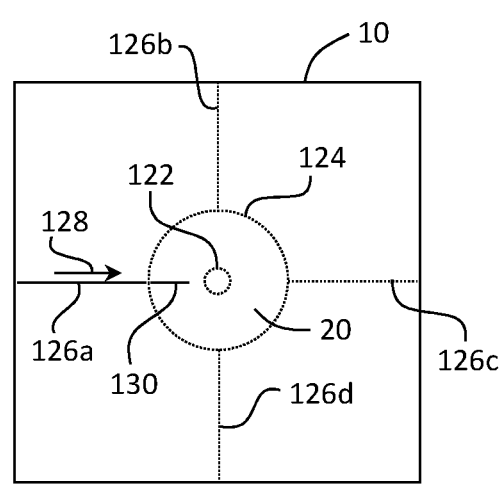
FIG. 8 is a schematic diagram showing a crack extending into a part to be removed from the substrate.

FIG. 8 shows a glass substrate 10 comprising an annulus 20 defined between first, inner fault line 122 and second, outer fault line 124, depicted as dotted lines. Neither first fault line 122 nor second fault line 124 has been consolidated by a crack that extends along the fault lines between adjacent defect lines. FIG. 7 further depicts four release lines 126a-126d, wherein a crack has been driven along fault line 126a using a suitable heat source, for example an infrared laser beam. Accordingly, release line 126a is shown as a solid line. As the crack propagates along release line 126a, as indicated by arrow 128, it encounters second fault line 124. Since no crack yet exists at second fault line 124, the crack propagating along release line 126a is free to extend beyond second fault line 124, and in the process forms a crack into the desired part (i.e., annulus 20), as indicated by crack portion 130. This can be mitigated, for example by ending the release lines further away from the desired part edge. However, the appropriate distance depends on such factors as glass composition, thickness, laser power, speed, humidity, etc. Thus, it is preferable the consolidating cracks be created along the fault lines defining the desired part prior to driving cracks along the release lines. In this instance, this means driving a crack around second fault line 124 prior to driving a crack along release line 126a.

Figure 9A:
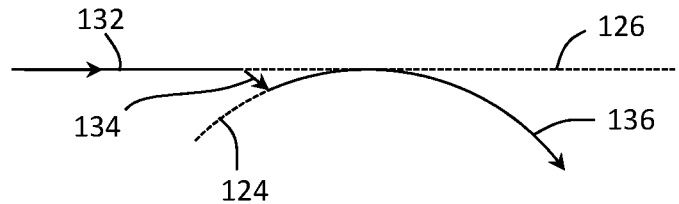
FIGS. 9A-9D are schematic diagrams of difference scenarios resulting from the order in which separation along a fault line occurs.
Figure 9B:
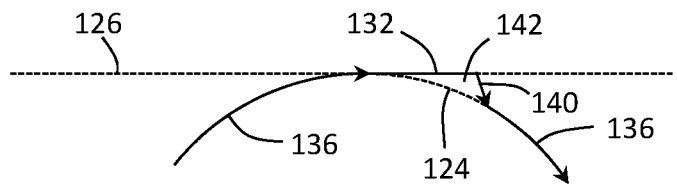
Figure 9C:
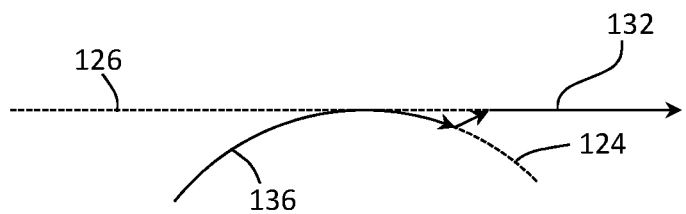
Figure 9D:
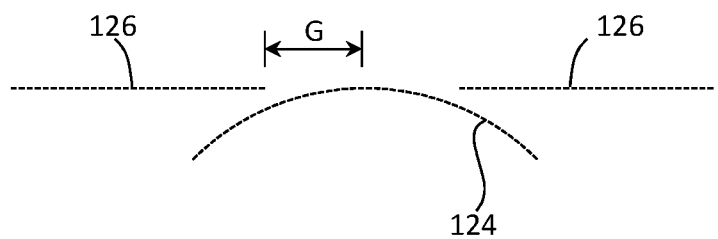

While the foregoing discussion dealt largely with orthogonal (or nearly orthogonal) intersection between release lines and fault lines, as noted, release lines can also approach fault lines tangentially. See, for example, FIGS. 9A-9D illustrating a portion of a fault line 124, in this instance a portion of a circular fault line, and a tangential release line 126 that overlaps with the fault line. It should first be noted that as the crack propagating along release line 126 (indicated by solid line 132) approaches the fault line, shadowing can occur. Moreover, if, as shown in FIG. 9A crack propagation (separation) begins at a release line prior to separation along the fault line, the propagating crack may jump from the release line to the fault line as indicated by arrow 134 and continue around fault line 124 (as indicated by solid line 136). On the other hand, if separation is performed on the fault line prior to the release line, as shown in FIG. 7B, the opposite can occur, where the propagating crack jumps from the fault line to the release line, as indicated by arrow 140. While the attached "dog ear" of glass 142 is typically small and can be removed, for example by grinding, more grinding that would otherwise be needed may need to be performed, and additional inspection may be required. Similarly, the crack may jump from the fault line to the release line, as shown in FIG. 7C, resulting in incomplete separation of the part. The problems associated with tangential release lines can be mitigated if, for example, release lines terminate prior to reaching the fault line such that there is a gap G between the terminal end of the release line 126 and the fault line 124, as shown in FIG. 7D. In the embodiment of FIG. 7D, separation can be performed along fault line 124 without danger of the propagating crack jumping to either of the release lines 126. Once the separation along fault line 124 is competed, separation along the release lines 126 can be performed.

It should be further noted that different laser conditions can be used when forming defect lines for the release lines than for the fault lines. For example, more "aggressive" laser conditions (e.g., greater pulse energy) can be used for the release lines, since edge quality of less of a concern that for the fault lines that define the edges of the desired part.

Figure 10:
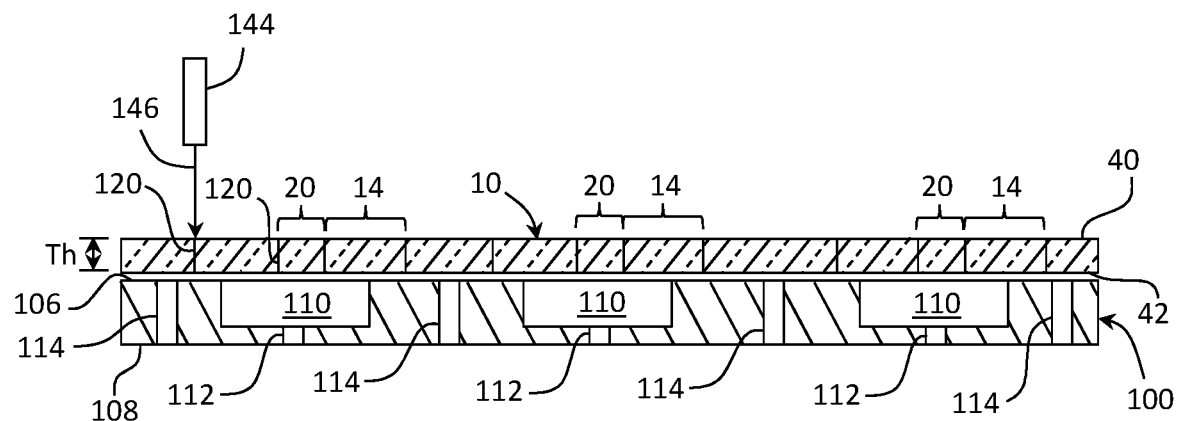
FIG. 10 is a cross sectional diagram showing a laser being used to drive a crack along a fault line.

FIG. 10 is a cross sectional view of glass substrate 10 positioned on support substrate 100, showing plugs 16. In the view shown in FIG. 10, defect lines have been produced, such as in accordance with but not limited to methods described herein. As shown, the plugs 16 are positioned over recesses 110.

In the instance where stress produced by the formation of the defect lines is insufficient to isolate the plugs 16 from the surrounding substrate via self-initiated separation, an optional step may be performed, illustrated in FIG. 10, wherein a heat source, e.g., an infrared laser 144 (e.g., a $CO_2$ or CO laser) generating a laser beam 146 is used to traverse the laser beam over the fault lines and release lines produced during the creation of the defect lines, to promote separation. That is, by driving a crack along the fault lines and release lines.

In some embodiments, a plurality of lasers may be used to reduce production time. This optional step may be necessary, for example, if substrate 10 lacks the requisite central tension to promote self-isolation. It should be emphasized that the heating of the fault line is performed under conditions selected such that no ablation, melting or vaporization of the glass substrate occurs. To that end, laser beam 146 may be defocused to prevent overheating of the glass substrate as described in detail above.

Figure 11:
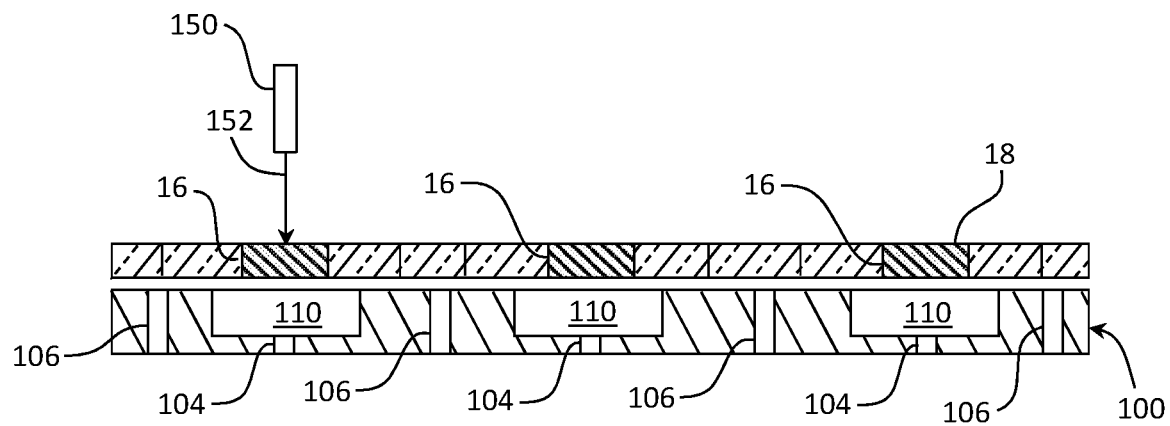
FIG. 11 is a cross sectional view of the glass substrate of FIG. 8 positioned on a support substrate, wherein a portion of the plugs formed in the glass substrate are heated to a temperature at or greater than the softening temperature of the plug.

Once separation and/or isolation has been achieved, either by self-isolation (for high central tension substrates), or induced isolation via heating of the fault and release lines, in a subsequent step, plugs 16 may be heated. For example, in some embodiments a laser 150, for example a $CO_2$ laser, producing laser beam 152 (as shown in FIG. 11) may be employed. Optionally, the laser may be the same laser used in the previous optional separation step, i.e., laser 146. In accordance with the present embodiment, plugs 16 are heated such that only a portion of each plug is heated, for example to a temperature equal to or greater than the softening temperature of the plug material (e.g., glass). A number of heating techniques may be used. For example, in one embodiment, laser beam 152 is directed at the center of the plug, heating only the central portion of the plug, for example to a temperature equal to or greater than a softening temperature of the plug. In another embodiment, laser beam 152 may be traversed over the plug along a path of substantially the same shape as predetermined path 12 defining the plug but spaced apart from that path. For example, if predetermined path 12 is a circular path, laser beam 152 may be traversed over the plug along a circular path spaced apart and interior to path 12. The laser beam may be traversed along the path only a single time, or in other embodiments the laser beam may be traversed over the path multiple times. In some embodiments, laser beam 114 may be traversed over multiple paths, for example multiple circular paths of different diameter, the multiple paths spaced apart from each other. In still other embodiments, laser beam 152 may be traversed over plugs 16 along a spiral path spaced apart from and interior to first path 12. It should be noted that, unlike the instance when a $CO_2$ laser is used to heat the fault line, either by traversing directly over the fault line, or close to it, in the present instance, heating of the plug is performed relatively far from the predetermined contour defining the plug. Additionally, whereas before the laser beam may be a defocused laser beam to avoid overheating of the plug, in this situation overheating is desired.

Traverse of the laser beam may be accomplished, for example, with a galvometer, although in further embodiments, an axicon can be used to create a ring-shaped laser beam, thereby avoiding in some embodiments the need to traverse the laser beam. In some embodiments, the laser beam may be mounted on a gantry capable of at least two dimensional movement in a plane parallel with the glass substrate. In further embodiments, the gantry may be capable of three dimensional movement and include movement perpendicular to the plane of the glass substrate. In other embodiments, relative motion can be provided by moving the substrate and maintaining the laser assembly stationary.

While not wishing to be bound to theory, it is thought the heating of plug 16 produces deformation of the plug, for example by slumping of the plug under its own weight. Accordingly, once heating of plugs 16 is completed, the plugs are allowed to cool for a time sufficient that the plugs fall from the glass substrate. Suitable cooling times are typically in a range from about 10 seconds to 40 seconds, for example in a range from about 20 seconds to about 40 seconds, for example in a range from about 25 seconds to about 35 seconds. It is believed the heating of the plugs causing slight slumping of the plugs and cooling shrinks the plugs 18, thereby producing a sufficient gap between the plugs and the surrounding glass substrate to facilitate removal of the plugs. In such an instance, a diameter of the plug at a "top" surface of the plug (the surface of the plug that is heated, for example, the surface upon which the heating laser beam impinges) after heating and subsequent cooling is less than the diameter of the top surface before heating. Additionally, a diameter of the bottom surface (opposite the heated surface) after the heating and subsequent cooling is similarly less than the diameter of the bottom surface before heating. The difference between the two diameters (top and bottom) is one of magnitude. In the present embodiment, the diameters of the top surface and the bottom surface are equal, or substantially equal (within measurement precision). However, after heating and subsequent cooling of the plug central region, the diameter of the upper surface of the plug is less than the diameter of the lower surface of the plug. Forced (active) cooling of the plugs can be used subsequent to the heating, but is generally unnecessary and could in some instances produce non-uniform cooling, as both heating and cooling should be uniform to prevent asymmetric stresses and non-uniform shape, i.e., it is desirable to produce a consistent gap around the plug to prevent contact between the plug and the surrounding substrate, which can result in chipping. Indeed, it has been found that in most cases, upon cooling passively, the plugs typically fall from the substrate via their own weight, without the need for additional force to be applied.

Figure 12:
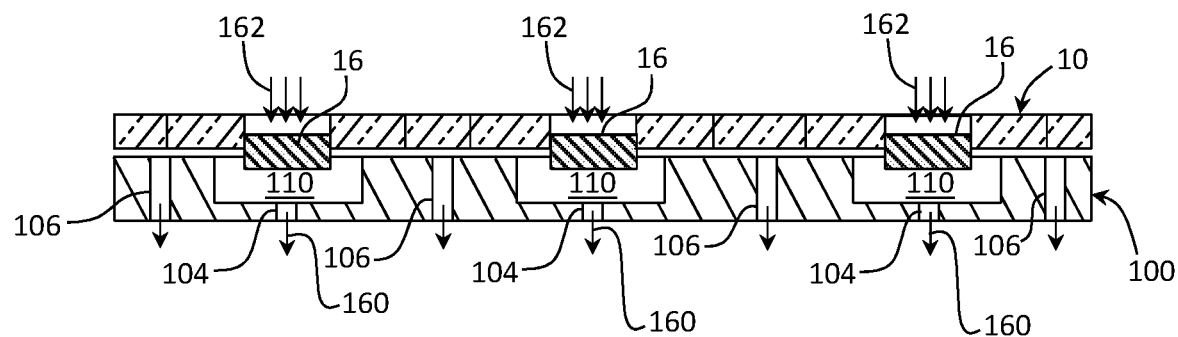
FIG. 12 is a cross sectional view of the glass substrate of FIG. 11 positioned on a support substrate, wherein a vacuum is applied to the isolated plugs through recesses in the support substrate, thereby causing air pressure above the plugs to drive the plugs from the glass substrate.

In an optional step shown in FIG. 12, if desired, a vacuum can be applied to passages 104, as indicated by arrows 160, which reduces the pressure within recesses 110. As a result, air pressure above the plugs 16, indicated by arrows 162, can be used to assist extraction of plugs 16 from glass substrate 10 and into recesses 102. Alternatively, a mechanical force may be applied against the plugs 16, for example by a push rod or pipe.

After removal of plugs 16 from glass substrate 10, other parts of substrate 10 can be removed, including peripheral (scrap) pieces joined by release lines 126 so that annulus 20 can be removed.

Figure 13:
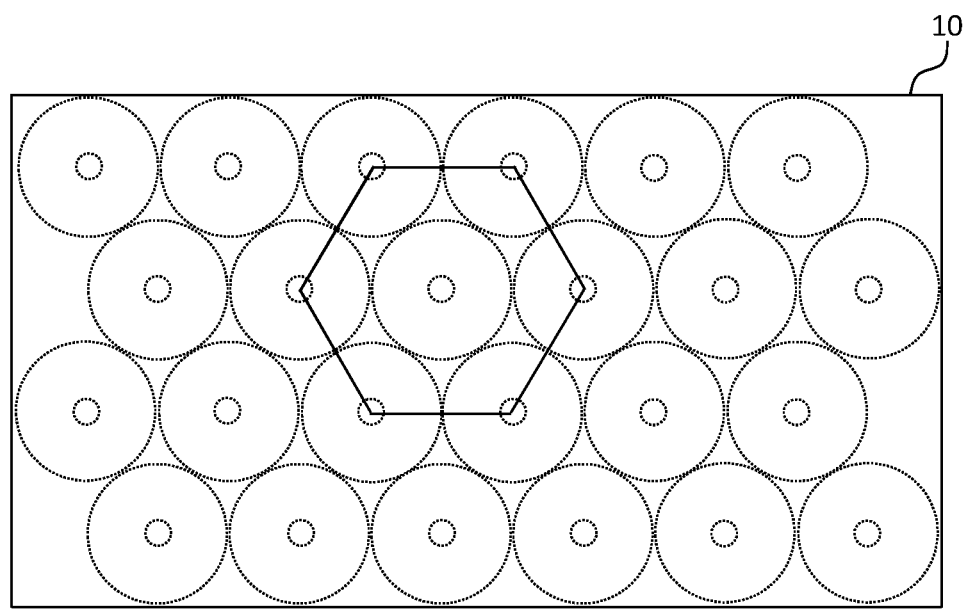
FIG. 13 illustrate a more densely packed arrangement of parts on a substrate (e.g., hexagonal close-packed)

The processes described herein can be used to quickly produce multiple articles, for example multiple annuli, from a single substrate. Articles can be closely positioned on the substrate to maximize material utilization. For example, FIG. 13 illustrates how hexagonal close packing can be used to maximize the utilization of glass substrate 10. In some embodiments, substrates can be stacked, wherein multiple substrates positioned one on top of the other, can have defect lines produced simultaneously in the stacked substrates, provided the focal line is made sufficiently long. However, forming defect lines in multiple substrates simultaneously still may require heating along the paths followed by the defect line laser to promote crack propagation as in un-stressed single substrates. Thus, multiple substrates may include the additional step of separating the stacked substrates into single substrates to perform the subsequent heating step.

In other embodiments, other methods of removing plug 16 may be used. More generally, the gap between the outer diameter of the plug 16 and the inner diameter of the annulus 20 should be increased in accordance with the following equation:

$$D_{initial} > \text{sqrt}(D_{final}^2 + P_{thickness}^2), \quad 1)$$

Where $D_{initial}$ represents the initial diameter of plug 16, $D_{final}$ represents the final diameter of the plug, and $P_{thickness}$ is the thickness of the plug (which should be equivalent to the thickness Th of the glass substrate). Said differently, when the maximum length of a diagonal line extending from an upper edge of the plug to a bottom edge of the plug, the diagonal in the same plane as a diameter of the plug (the plane being perpendicular to the major surfaces of the plug and the diameter of the plug lying in the same plane) is less than the initial diameter of the plug, the plug should drop from the glass substrate. As an example, for a plug with an initial diameter $D_{initial}$ of 25 millimeters and a thickness $P_{thickness}$ of 0.7 millimeters, the required shrinkage of the plug is greater than 392 ppm. In addition to distorting the plug as previously described, other methods of reducing the final diameter of the plug, or the inside diameter of the surrounding glass (e.g., annulus 20). Such methods can include active cooling of the plug. In this instance, rather than heating a central portion of the plug, then cooling, or allowing the plug to passively cool, the plug can be actively and rapidly cooled, for example by directing a spray or stream of liquid nitrogen, or similar fluid, at the plug, thereby causing the plug to contract and forming a sufficiently large gap between the plug and the surrounding material that allows the plug to be removed without damage to the surround material. In other embodiments, the entire glass substrate, include isolated parts, can be heated, for example in an oven, after which the plug can be cooled. For example, the glass substrate can be heated to a suitably high temperature, e.g., about 112° C. based on a CTE of about 3.5 ppm), after which the plug can be cooled to a temperature of about 0° C., again by the use of liquid nitrogen or other sufficiently cold fluid.

The methods described herein provide the following benefits that may translate to enhanced laser processing capabilities and cost savings and thus lower manufacturing cost. The cutting process described herein offers full separation (isolation) of interior contours being cut. The methods described herein are capable of completely removing plugs from a parent substrate in a clean and controlled fashion in ion-exchangeable glass (such as Gorilla® glass, Corning glass codes 2318, 2319, 2320 or the like) as produced by the fusion draw process, or other glass forming processes, before or after the glass part has undergone chemical strengthening. The methods described herein also offer reduced sub-surface defects and excellent edge quality. Due to the ultra-short pulse interaction between laser and material, there is little thermal interaction and thus a minimal heat affected zone that can result in undesirable stress and micro-cracking outside the fault lines. In addition, the optics that condense the laser beam into the glass creates defect lines that are typically in a range from about 2 micrometers to about 5 micrometers in diameter on the surface of the part. The defect lines may be periodically spaced apart, wherein the spacing can be in a range from about 1 micrometer to about 50 micrometers, for example in a range from about 1 micrometer to about 20 micrometers, such as in a range from about 5 micrometers to about 15 micrometers. After removal of the parts, the subsurface damage is typically less than about 75 micrometers, and can be adjusted, if desired, to be less than about 25 micrometers. The roughness of the separated surface (or cut edge), can be controlled via the spot size or the spot diameter of the focal line. A roughness of the separated (cut) edge surface, which can be, for example, in a range from about 0.1 to about 1 micrometers, or for example in a range from about 0.25 to about 1 micrometers, can be characterized, for example, by an Ra surface roughness statistic (arithmetic average of absolute values of the heights of the sampled surface, which include the heights of bumps resulting from the spot diameter of the focal line). The surface roughness generated by this process is often less than about 0.5 micrometers (Ra), and can be as low as 0.1 micrometers (Ra), although edge surface roughness and edge strength were unexpectedly found to be only weakly correlated. In addition, if mechanical finishing processes such as grinding and polishing are later used to modify the edge shape, the amount of material removal required will be lower for parts with less sub-surface damage. This reduces or eliminates finishing steps and lowers part cost. The plug release process described herein takes full advantage of the high-quality edge created by this line-focus picosecond laser cutting process such that removal of the interior glass material is done in a manner that cleanly releases the glass along the fault line, and produces little to no ablative damage, micro-cracking, or other defects to the desired part edge.

Unlike processes that use a focused laser to purely ablate material along given path, the laser processes disclosed herein can produce a fault line in a single pass. The fault line may be created by picosecond laser processes described herein at speeds in a range from about 50 millimeters/second to about 3000 millimeters/second, depending on the acceleration capabilities of the stages involved. This is in contrast to ablative drilling methods, where material is removed "layer by layer" and requires many passes or long residence times per location of the laser beam.

The methods described herein are capable of cutting and separating glass or other transparent brittle materials in a clean and controlled fashion. It is very challenging to use conventional ablative or thermal laser processes because they tend to trigger heat affected zones that induce microcracks and fragmentation of the glass into several smaller pieces. The characteristics of the laser pulses and the induced interactions with the material of the disclosed methods avoid these issues because defect creation occurs in a very short time scale and the material transparency to the laser beam used to form the defect lines minimizes the induced thermal effects. Since the defect line is created within the substrate, the presence of debris and adhered particles during the cutting step is virtually eliminated. If there are any particles resulting from the created defect line, they are well contained until the part is separated.

The methods described herein enable the cutting and separation of glass and other substrates following many forms and shapes, which can be a limitation in other competing technologies. Small radii may be cut (e.g., less than about 2 millimeters), allowing creation of small holes and slots (such as required for speakers and/or microphones in cell phone applications).

In some embodiments, a plurality of substrates may be stacked, for example two substrates, three substrates or more substrates, wherein the laser beam focal line extends through each substrate of the stack of substrates, thereby forming a plurality of defect lines that extend through each substrate of the stack of substrates.

Processes to fabricate glass plates from incoming glass panels to the final size and shape can involve several steps that encompass cutting the panel, cutting to size, finishing and edge shaping, thinning the parts down to their target thickness, polishing, and even chemically strengthening in some cases. Elimination of any of these steps will improve manufacturing cost in terms of process time and capital expense. The methods described herein may reduce the number of steps, for example, by reducing debris and edge defects generation, and the potential elimination of washing and drying stations, and cutting the sample directly to its final size, shape and thickness, thereby eliminating the need for finishing lines.

Thus, according to some embodiments, a glass article has at least one inner contour with a plurality of defect lines (or portions thereof) extending perpendicular to the face of the glass sheet at least 250 micrometers, the defect lines each having a diameter less than or equal to about 5 micrometers. In some embodiments, the glass article comprises defect lines that extend the full thickness of the substrate. The distance between the defect lines can be, for example, less than or equal to about 7 micrometers. In some embodiments, the smallest dimension or width of the interior contour defined by the inner contour edge can be less than about 5 millimeters, for example it may be 0.1 millimeters to 3 millimeters in width (or diameter), e.g., in a range from about 0.5 millimeters to about 2 millimeters, although in further embodiments, the inner contour edge can have larger dimensions, such as in a diameter range from about 10 millimeters to about 100 millimeters, for example in a range from about 20 millimeters to about 50 millimeters. According to some embodiments, the glass article comprises postion exchanged glass. According to some embodiments, the defect lines extend the full thickness of the at least one inner contour edge. According to at least some embodiments, the at least one edge surface has an Ra surface roughness less than about 0.5 micrometers after removal of a part from substrate 10. According to at least some embodiments, the at least one edge has sub-surface damage up to a depth less than or equal to about 75 micrometers.

The foregoing process yields a consistent edge. This results in edge strength, as measured by a 4-pt bend test, with a tight distribution. For a non-chemically strengthened glass like Corning Eagle XG®, the resulting edge strength can have an average value greater than about 90 MPa, with a standard deviation typically less than about 15 MPa. Furthermore, since the defect lines are generally made symmetrically through the full body of the substrate, the edge strength will generally be close to identical (within 10%) whether or not the top or bottom surface of the part is placed in tension during the strength testing. A difference between the strength distribution from one major surface to the opposite major surface (depending on the direction of bend) is less than 10% of the mean strength distribution. The edge surfaces exhibit no chipping with a size greater than about 50 micrometers in lateral extent evaluated by examining a region of 500 micrometers in width along the full perimeter of the inner and outer edge surfaces.

Figure 14A:
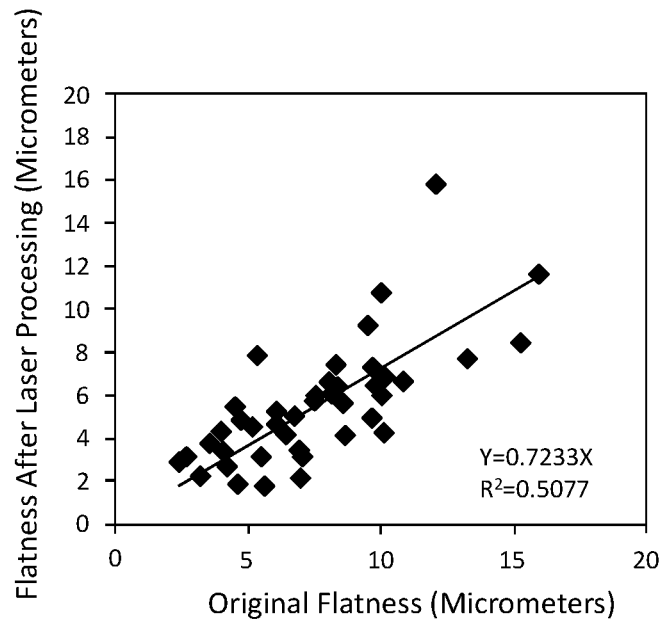
FIG. 14A is a graph showing warp of the original warp of a substrate from which an annulus is produced.
Figure 14B:
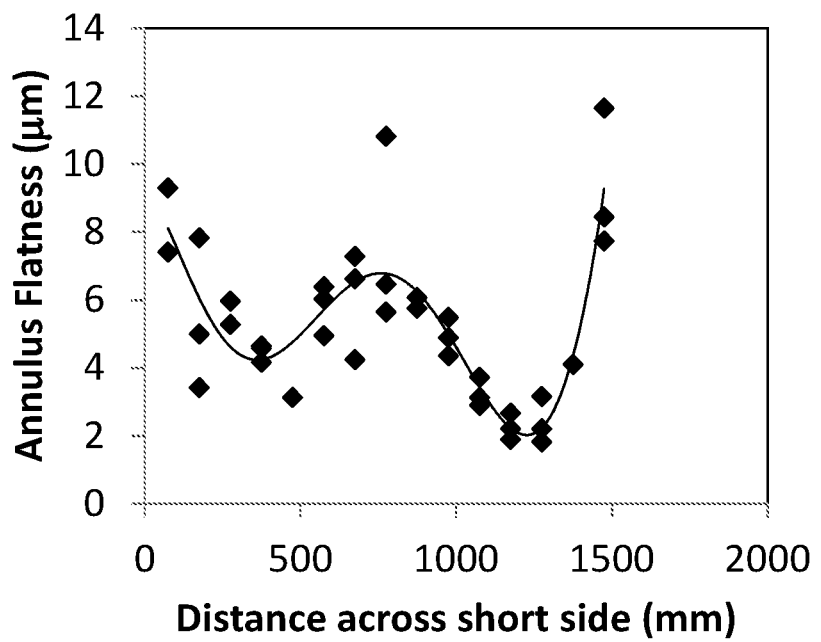
FIG. 14B is a graph showing warp of the annulus produced from the substrate of FIG. 14A.

Articles produced by the foregoing process exhibit low warp, as can be seen by FIG. 14. FIG. 14 shows the warp (flatness) data of 95 millimeter outer diameter annuli (26 mm inner diameter) taken at different lateral points across a fusion drawn glass substrate. The annuli were cut from 100×100 millimeter segments of the substrate that were measured for flatness before laser cutting into annuli (FIG. 14A). After laser cutting into annuli, the flatness of each disk was re-measured (FIG. 14B). The data of FIG. 14B indicate the flatness of each final annulus as a function of its original spatial location in the fusion draw sheet. These data indicate that the laser-cut annuli maintained flatness equal to or less than about 15 micrometers. Comparison with the original flatness data also indicates the flatness of each annulus agreed well with the flatness of the 100×100 millimeter cut squares. Articles produced by methods disclosed herein can have a total thickness variation (difference between maximum and minimum thickness) equal to or less than about 10 micrometers. Flatness (warp) was measured using a NEXIV VMR 3020 coordinate measuring system available from Nikon® and employing MountainsMap® analysis software by Digital Surf.

Articles produced by the foregoing processes may comprise equal to or less than about 5 MPa internal residual stress, and in some embodiments equal to or less than about 0.5 MPa residual stress.

Annuli produced by methods disclosed herein can have a concentricity (evaluated as the distance between the centers of the inner and the outer perimeters of the annuli) equal to or less than about 15 micrometers, for example in a range from about 0 micrometers to about 12 micrometers, in a range from about 0 micrometer to about 10 micrometers, in a range from about 0 micrometers to about 5 micrometers, and in some embodiments in a range from about 2 micrometers to about 6 micrometers. Outer diameters of the annulus can be within +/−12 micrometer of the nominal diameter. Concentricity was measured using a NEXIV VMR 3020 coordinate measuring system, available from Nikon® and employing MountainsMap® analysis software by Digital Surf.

In the instance where the article is a platter for a hard drive device, for example, the article may undergo additional processing. For example, the edge surfaces of the article may be ground and/or polished to the drive manufacturer's specifications. The edges of the annulus may additionally be beveled. In some embodiments, the major surfaces 40, 42 of the glass substrate may be ground and/or polished. In such instance, a total of no more than about 0.1 mm of glass need be removed from the major surfaces of the glass article after removal of the article from the surrounding substrate. Additionally, the annulus may be coated as is customary for a hard drive platter. For example, the annulus may be coated with a coating of magnetic media.

In some embodiments it may be desirable to ion exchange the glass substrate. In such instances, it is preferably that the ion-exchange process be performed prior to the cutting processes.

EXAMPLE

A Corning Lotus NXT glass substrate 0.7 mm thick was positioned on a polymer support substrate, the support substrate comprising a plurality of recesses, each recess having a 30 millimeter diameter and a 2 millimeter depth. The substrate was held in place by a series of through holes in the polymer substrate and a vacuum was applied to the through holes. A plurality of defects were formed along a plurality of first circular paths and a plurality of second circular paths concentric with the first closed paths using a Coherent Hyperrapid Picosecond laser operating at 29 watts, with a pulse width of about 9 picoseconds, a pulse frequency of 100 kHz, and operating in a burst mode with 5 pulses per burst. The line focus diameter was approximately 2 micrometers (FWHM), with a length of 1.2 millimeters. The laser was traversed at a speed of 12 meters/minute to produce defect lines spaced 4 micrometers apart along each of the first and second closed paths. Radii of the first closed paths were 25 millimeters and radii of the second closed paths were 95 millimeters. The first and second closed paths defined a plurality of annuli. The plurality of first closed paths defined a plurality of plugs.

Upon completion of the defect forming stage, the first and second closed paths were traced using a 200 watt Synrad CW laser operating at 170 watts, defocused to a 7 millimeter beam diameter at the glass surface, wherein the laser beam was traversed at about 12 meters/minute to join the defect lines along each of the first and second paths with a crack, thereby isolating the annuli from the glass substrate and the plugs from the disc defined by the second circular paths.

The plugs were then heated using the same Synrad CW $CO_2$ laser operating at 200 watts and adjusted to produce a defocused 6 millimeter diameter laser beam at the glass surface. This laser beam traced a 10 millimeter diameter circle four times within approximately 4 seconds. The plugs were allowed to cool passively (without active cooling), whereupon the plugs dropped from the glass discs within about 25 seconds after the beginning of cooling (at the cessation of heating).

While exemplary embodiments have been disclosed herein, it will be understood by those skilled in the art that various changes in form and details may be made therein without departing from the scope of the invention encompassed by the appended claims.

What is claimed is:

1. A method of cutting an article from a substrate, comprising:
    focusing a pulsed laser beam into a laser beam focal line;
    directing the laser beam focal line into the substrate at a first plurality of locations along a first predetermined path, the laser beam focal line generating an induced absorption within the substrate that produces a defect line within the substrate along the laser beam focal line at each location of the first plurality of locations, wherein the first predetermined path is a closed path;
    heating the substrate along the first predetermined path to propagate a crack through each defect line of the first plurality of locations to form a cleave that extends completely through the substrate along the first predetermined path, thereby completely isolating an interior plug from the substrate; and
    heating the interior plug after the isolating such that at least a portion of the interior plug is heated to a temperature equal to or greater than a softening temperature of the substrate; and
    allowing the interior plug to cool after the heating to remove the plug from the substrate.

2. The method according to claim 1, wherein the substrate is transparent at a wavelength of the pulsed laser beam.

3. The method according to claim 1, wherein the first predetermined path is a circular path.

4. The method according to claim 1, wherein the defect line extends through an entire thickness of the substrate.

5. The method according to claim 1, further comprising directing the laser beam focal line into the substrate at a second plurality of locations along a second predetermined path not intersecting the first predetermined path, the laser beam focal line generating an induced absorption within the substrate that produces a defect line along the laser beam focal line within the substrate at each location of the second plurality of locations.

6. The method according to claim 5, further comprising heating the substrate along the second predetermined path to propagate a crack through each defect line of the second plurality of locations.

7. The method according to claim 5, wherein first predetermined path is a circular path and the second predetermined path is a circular path concentric with the first predetermined circular path.

8. The method according to claim 7, wherein a radius of the second predetermined path is greater than a radius of the first predetermined path, the first predetermined path and the second predetermined path defining an annulus therebetween.

9. The method according to claim 5, further comprising directing the laser beam focal line into the substrate at a third plurality of locations along a third predetermined path, the laser beam focal line generating an induced absorption within the substrate that produces a defect line along the laser beam focal line within the substrate at each location of the third plurality of locations, the third predetermined path extending from an edge of the substrate to the second predetermined path.

10. The method according to claim 9, further comprising heating the substrate along the third predetermined path to propagate a crack through each defect line of the second plurality of locations.

11. The method according to claim 1, wherein heating the substrate along the first predetermined path comprises traversing a second laser beam over the first predetermined path.

12. The method according to claim 11, wherein the second laser beam is a defocused laser beam.

13. The method according to claim 12, wherein the second laser beam is a continuous wave laser beam.

14. The method according to claim 1, wherein heating the plug after the isolating comprises heating the plug with a heat source selected from the group consisting of a second laser beam, an infrared LED, an infrared lamp, and an electrical resistance heater.

15. The method according to claim 14, wherein the heat source heats only a central area of the plug.

16. The method according to claim 14, wherein the second laser beam traverses on the plug a plurality of closed paths spaced apart from the first predetermined path.

17. The method according to claim 1, wherein the plug deforms during heating of the plug.

18. The method according to claim 1, further comprising positioning the substrate on a first major surface of a support substrate, the first major surface of the support substrate comprising a recess positioned below the plug.

19. The method according to claim 18, further comprising restraining the substrate on the support substrate to prevent movement of the substrate.

20. The method according to claim 19, wherein the support substrate comprises a plurality of passages extending from a first major surface of the support substrate to a second major surface of the support substrate, and wherein the restraining comprises applying a vacuum to the plurality of passages.

21. The method according to claim 18, further comprising reducing a pressure within the recess.

22. The method according to claim 18, wherein a depth of the recess is greater than a thickness of the plug.

23. The method according to claim 1, further comprising cooling the interior plug after the heating of the plug.

24. The method according to claim 23, wherein the interior plug drops from the substrate upon cooling without application of an external mechanical force to the interior plug.

25. A glass article made by the method according to claim 1.

* * * * *